US009681056B2

United States Patent
Nonaka et al.

(10) Patent No.: US 9,681,056 B2
(45) Date of Patent: Jun. 13, 2017

(54) IMAGING SYSTEM, DISPLAY SYSTEM, AND OPTICAL DEVICE INCLUDING PLURALITY OF OPTICAL SYSTEMS THAT HAVE A PLURALITY OF OPTICAL AXES

(71) Applicant: Olympus Corporation, Shibuya-ku, Tokyo (JP)

(72) Inventors: Osamu Nonaka, Sagamihara (JP); Hiroshi Kodama, Hachioji (JP); Kunio Yamamiya, Sagamihara (JP); Shinya Abe, Hachioji (JP); Eiichi Fuse, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 121 days.

(21) Appl. No.: 14/613,452

(22) Filed: Feb. 4, 2015

(65) Prior Publication Data

US 2015/0229815 A1    Aug. 13, 2015

(30) Foreign Application Priority Data

Feb. 7, 2014    (JP) ................. 2014-022491

(51) Int. Cl.
H04N 5/232    (2006.01)
H04N 5/225    (2006.01)

(52) U.S. Cl.
CPC ....... *H04N 5/23296* (2013.01); *H04N 5/2258* (2013.01); *H04N 5/23293* (2013.01)

(58) Field of Classification Search
CPC ................................. H04N 5/23209
See application file for complete search history.

(56) References Cited

U.S. PATENT DOCUMENTS

| 2006/0044634 A1* | 3/2006 | Gruhlke | H04N 1/486 358/505 |
| 2007/0097249 A1* | 5/2007 | Korenaga | G02B 5/1876 348/335 |
| 2013/0093842 A1* | 4/2013 | Yahata | H04N 5/23238 348/38 |
| 2015/0022694 A1* | 1/2015 | Jogetsu | H04N 5/23209 348/240.1 |

FOREIGN PATENT DOCUMENTS

| JP | 2002-281361 | 9/2002 | |
| JP | 2013-085176 | 5/2013 | |
| JP | WO2013153712 | * 10/2013 | ......... H04N 5/23296 |

\* cited by examiner

*Primary Examiner* — Christopher K Peterson
(74) *Attorney, Agent, or Firm* — John C. Pokotylo; Straub & Pokotylo

(57) ABSTRACT

An imaging system includes: an imaging device; and an optical device that forms a subject image on an imaging plane of an imaging element and that is freely attachable to and detachable from the imaging device. The optical device includes a combination of a plurality of optical systems to provide a plurality of optical axes. The plurality of optical systems include: a plurality of first imaging optical systems; and a second imaging optical system having a view angle narrower than that of each of the plurality of first imaging optical systems. The plurality of first imaging systems are respectively arranged to surround the second imaging optical system, as viewed from a subject side.

12 Claims, 16 Drawing Sheets

FIG.6

| | |
|---|---|
| FIRST LEFT WIDE ANGLE LENS | RANGE INFORMATION |
| | OPTICAL AXIS COORDINATE INFORMATION |
| | FOCAL DISTANCE INFORMATION |
| | USE INFORMATION |
| | PAIR INFORMATION |
| | SEPARATION DISTANCE INFORMATION |
| FIRST RIGHT WIDE ANGLE LENS | RANGE INFORMATION |
| | OPTICAL AXIS COORDINATE INFORMATION |
| | FOCAL DISTANCE INFORMATION |
| | USE INFORMATION |
| | PAIR INFORMATION |
| | SEPARATION DISTANCE INFORMATION |
| SECOND LEFT WIDE ANGLE LENS | RANGE INFORMATION |
| | OPTICAL AXIS COORDINATE INFORMATION |
| | FOCAL DISTANCE INFORMATION |
| | USE INFORMATION |
| | PAIR INFORMATION |
| | SEPARATION DISTANCE INFORMATION |
| SECOND RIGHT WIDE ANGLE LENS | RANGE INFORMATION |
| | OPTICAL AXIS COORDINATE INFORMATION |
| | FOCAL DISTANCE INFORMATION |
| | USE INFORMATION |
| | PAIR INFORMATION |
| | SEPARATION DISTANCE INFORMATION |
| TELEPHOTO LENS | RANGE INFORMATION |
| | OPTICAL AXIS COORDINATE INFORMATION |
| | FOCAL DISTANCE INFORMATION |
| | FOCUS ADJUSTMENT INFORMATION |
| | USE INFORMATION |

IMAGING SYSTEM, DISPLAY SYSTEM, AND OPTICAL DEVICE INCLUDING PLURALITY OF OPTICAL SYSTEMS THAT HAVE A PLURALITY OF OPTICAL AXES

CROSS-REFERENCE TO RELATED APPLICATIONS

This application is based upon and claims the benefit of priority from Japanese Patent Application No. 2014-022491, filed on Feb. 7, 2014, the entire contents of which are incorporated herein by reference.

BACKGROUND OF THE INVENTION

1. Field of the Invention

The present invention relates to an imaging system, a display system, and an optical device.

2. Description of the Related Art

Conventionally, a multi-eye type camera has been known, which uses a so-called multi-eye lens (pantoscopic lens) combined of a plurality of optical systems and having a plurality of optical axes, and which forms a plurality of subject images on an imaging plane of an imaging element by the multi-eye lens (for example, see Japanese Patent Application Laid-open No. 2002-281361, hereinafter, referred to as "Patent Literature 1").

A multi-eye type camera described in Patent Literature 1 uses a multi-eye lens combined of four optical systems. The four optical systems are arranged at positions where subject images are able to be respectively formed in four areas divided by light shielding plates on the imaging plane of the imaging element.

After shooting a subject, the multi-eye type camera performs image processing on the shot image to generate a new image. Specifically, the multi-eye type camera extracts respective images corresponding to the four areas from the shot image and synthesizes the respective images to generate the new image.

SUMMARY OF THE INVENTION

In accordance with some embodiments, an imaging system, a display system, and an optical device are presented.

In some embodiments, an imaging system includes: an imaging device; and an optical device that forms a subject image on an imaging plane of an imaging element and that is freely attachable to and detachable from the imaging device. The optical device includes a combination of a plurality of optical systems to provide a plurality of optical axes. The plurality of optical systems include: a plurality of first imaging optical systems; and a second imaging optical system having a view angle narrower than that of each of the plurality of first imaging optical systems. The plurality of first imaging systems are respectively arranged to surround the second imaging optical system, as viewed from a subject side.

In some embodiments, a display system includes: a display device; and an optical device that forms a subject image on an imaging plane of an imaging element and that is freely attachable to and detachable from the display device. The optical device includes: a plurality of optical systems that have a plurality of optical axes with different view angles and that respectively form subject images of a plurality of different view angles on the imaging plane of the imaging element; and a transmitting unit that transmits positional information related to positions at which the subject images are formed. The display device includes: a receiving unit that receives, when the optical device is attached to the display device, the positional information from the optical device; and a display control unit that causes display of the subject images of the plurality of different view angles to be changeable according to a result of reception by the receiving unit.

In some embodiments, an optical device includes: an imaging optical unit that includes a combination of a plurality of optical systems to provide a plurality of optical axes and that respectively forms a plurality of subject images on an imaging plane of an imaging element by the plurality of optical systems; a characteristic information recording unit that records therein respective characteristic information related to characteristics of the respective optical systems constituting the imaging optical unit; and a transmitting unit that transmits the characteristic information to a device that performs imaging in cooperation with the optical device. The plurality of optical systems include: at least one first imaging optical system; and a second imaging optical system having a view angle narrower than that of the at least one first imaging optical system.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of characteristic information recorded in a first recording unit illustrated in FIG. 1;

DETAILED DESCRIPTION OF THE PREFERRED EMBODIMENTS

Hereinafter, with reference to the drawings, modes for carrying out the present invention (hereinafter, referred to as "embodiments") will be described. The present invention is not limited by the embodiments described below. Furthermore, in describing the drawings, the same signs are appended to the same portions. Since the conventional use of a second optical device having a single optical axis is a widely well-known technique, description thereof will be simplified. In this case, although the range is changed by hand-shake correction or trimming, one image is basically acquired by approximately the whole of the imaging element. It is already well known that focusing, average photometry, partial photometry, or the like is utilized in order to perform control of exposure and focus such that this whole image becomes satisfactory.

First Embodiment

Schematic Configuration of Imaging System

Figure 1:
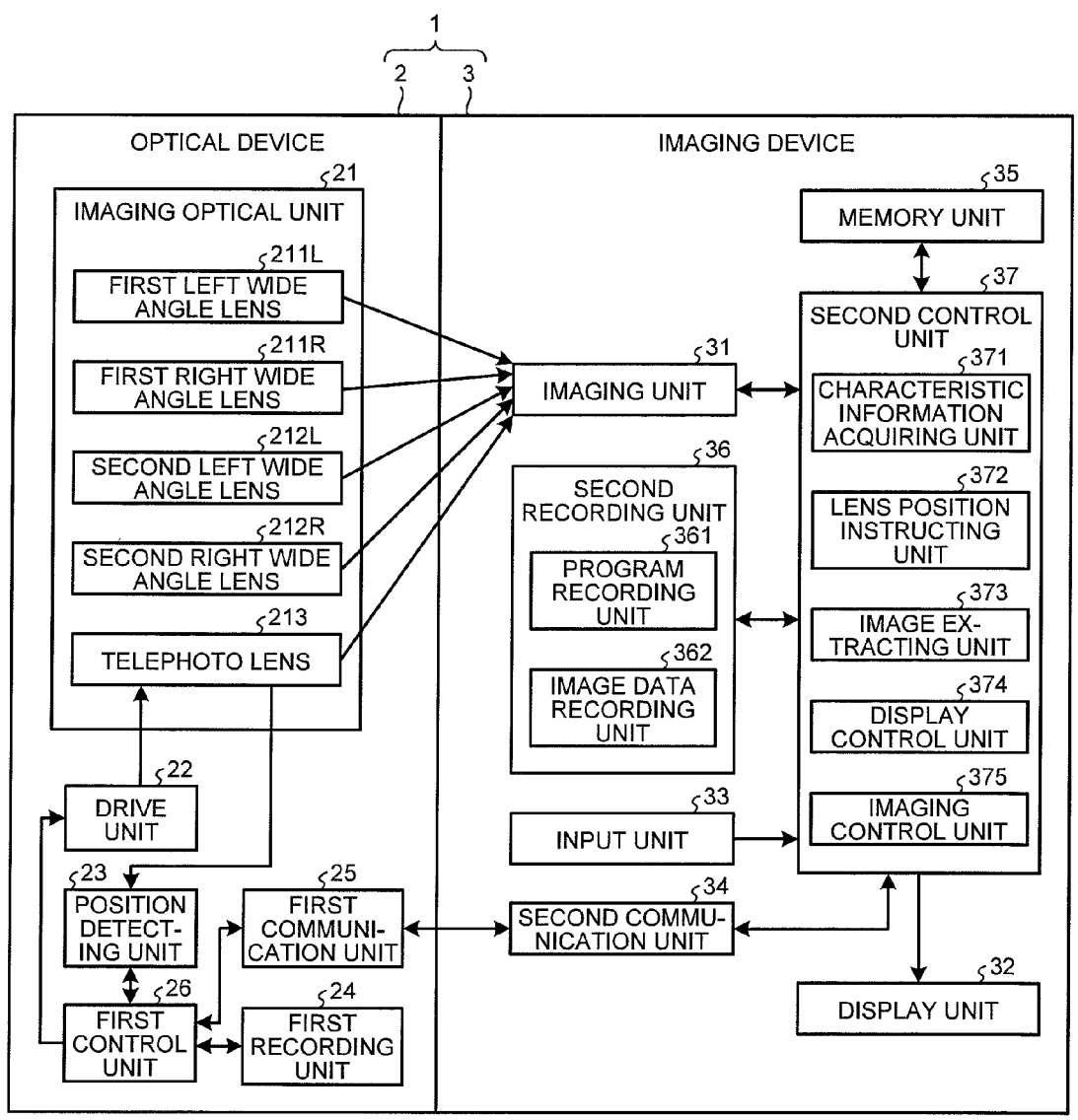
FIG. 1 is a block diagram illustrating a configuration of an imaging system according to a first embodiment of the present invention.

FIG. 1 is a block diagram illustrating a configuration of an imaging system 1 according to a first embodiment of the present invention.

The imaging system 1 is configured as a digital camera, and as illustrated in FIG. 1, includes an optical device 2, and an imaging device 3, to which the optical device 2 is attached.

Configuration of Optical Device

Examples of the optical device 2 include a first optical device having a plurality of optical axes, and a second optical device having a single optical axis. As stated above, since the second optical device is of a well-known technique, hereinafter, a configuration of the first optical device will be described intensively.

The optical device 2 has a function as a so-called interchangeable lens, and is attached freely detachably to the imaging device 3.

Hereinafter, main parts of the present invention will be mainly described, as a configuration of the optical device 2.

This optical device 2 includes, as illustrated in FIG. 1, an imaging optical unit 21, a drive unit 22, a position detecting unit 23, a first recording unit 24, a first communication unit 25, and a first control unit 26.

The second optical device having the single optical axis is different from the first optical device having the plurality of optical axes only in a configuration of its imaging optical unit, and has configurations corresponding to the drive unit 22, the position detecting unit 23, the first recording unit 24, the first communication unit 25, and the first control unit 26.

Figure 2:
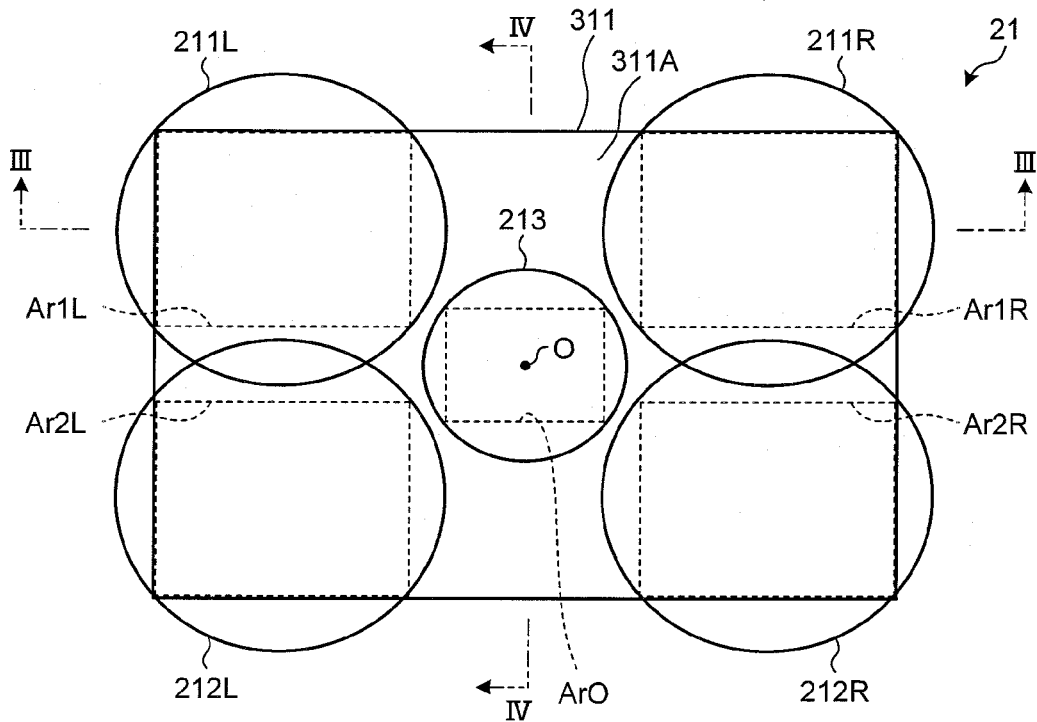
FIG. 2 is a diagram schematically illustrating a configuration of an imaging optical unit illustrated in FIG. 1.
Figure 3:
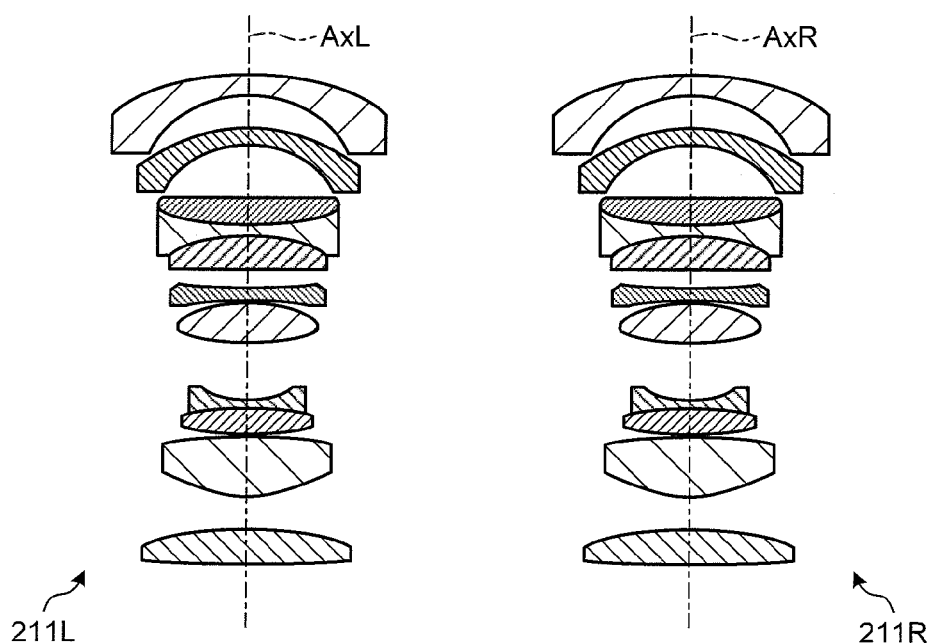
FIG. 3 is a diagram schematically illustrating a configuration of the imaging optical unit illustrated in FIG. 1.
Figure 4:
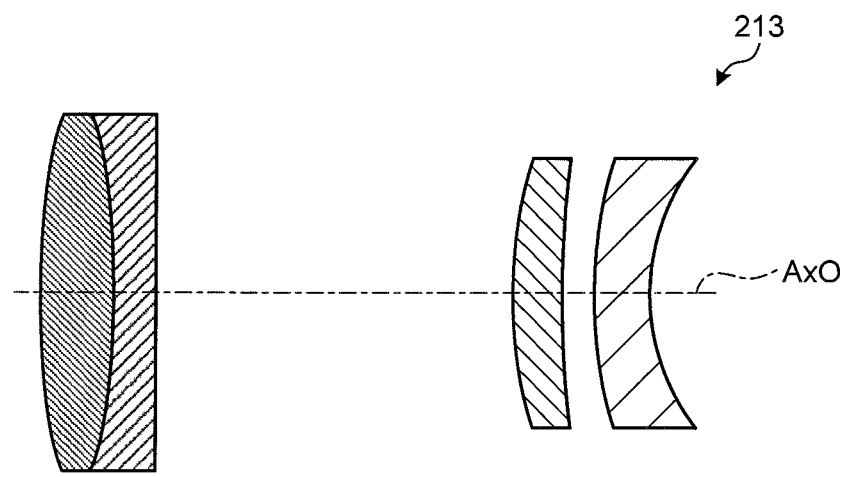
FIG. 4 is a diagram schematically illustrating a configuration of the imaging optical unit illustrated in FIG. 1.
Figure 5:
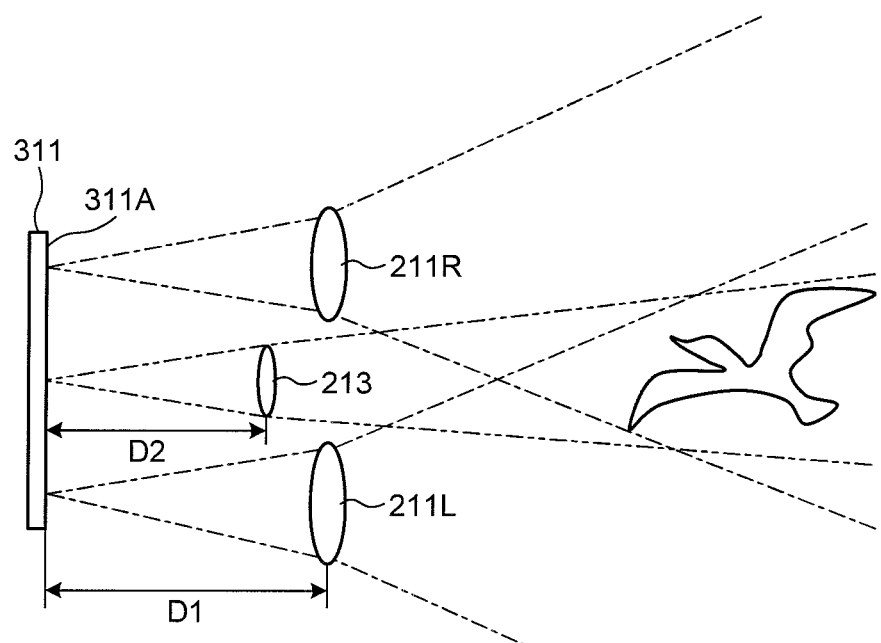
FIG. 5 is a diagram schematically illustrating a configuration of the imaging optical unit illustrated in FIG. 1.

FIG. 2 to FIG. 5 are diagrams schematically illustrating a configuration of the imaging optical unit 21. Specifically, FIG. 2 is a diagram of the imaging optical unit 21 as viewed from a subject side. FIG. 3 is a cross section diagram along line III-III illustrated in FIG. 2. FIG. 4 is a cross section diagram along line IV-IV illustrated in FIG. 2. FIG. 5 is a diagram of the imaging optical unit 21 as viewed from above.

The imaging optical unit 21 is configured of a so-called multi-eye lens (pantoscopic lens) combined of a plurality of optical systems, condenses light respectively from predetermined field areas, and forms images of the condensed light respectively on an imaging plane 311A (FIG. 2 and FIG. 5) of an imaging element 311 (FIG. 2 and FIG. 5) included in the imaging device 3. This imaging optical unit 21 includes, as illustrated in FIG. 1 to FIG. 5, a first left wide angle lens 211L (FIG. 1 to FIG. 3 and FIG. 5), a first right wide angle lens 211R (FIG. 1 to FIG. 3 and FIG. 5), a second left wide angle lens 212L (FIG. 1 and FIG. 2), a second right wide angle lens 212R (FIG. 1 and FIG. 2), and a telephoto lens 213 (FIG. 1, FIG. 2, FIG. 4, and FIG. 5).

In FIG. 2 and FIG. 5, for convenience of explanation, each of the lenses 211L, 211R, 212L, 212R, and 213 is artificially illustrated as a single lens.

The first left wide angle lens 211L is a fixed focus wide angle lens, which is combined of a plurality of lens groups (FIG. 3), has a focal distance comparatively short with respect to an imaging range, and has a focus position at a far distance. This lens may be said as having a wide view angle. That is, the first left wide angle lens 211L has a function as a first imaging optical system according to the present invention.

The first left wide angle lens 211L is supported by a lens barrel (illustration thereof omitted) such that the first left wide angle lens 211L is postured and positioned as described below in a state where the optical device 2 has been attached to the imaging device 3.

The first left wide angle lens 211L is supported by the lens barrel such that the first left wide angle lens 211L is postured with its optical axis AxL (FIG. 3) vertical to the imaging plane 311A and is positioned, as viewed from the subject side, on the upper left of the center "O" (FIG. 2) of the imaging plane 311A. That is, the first left wide angle lens 211L forms a subject image in an area Ar1L (FIG. 2) on the upper left in the imaging plane 311A.

The first right wide angle lens 211R is a wide angle lens having the same function and configuration as the first left wide angle lens 211L (FIG. 3) and only a position, at which the first right wide angle lens 211R is arranged inside the lens barrel, is different from that of the first left wide angle lens 211L. That is, the first right wide angle lens 211R has a function as a first imaging optical system according to the present invention.

The first right wide angle lens 211R is supported by the lens barrel such that the first right wide angle lens 211R is postured with its optical axis AxR (FIG. 3) being parallel to the optical axis AxL (being vertical to the imaging plane 311A) and positioned, as viewed from the subject side, on the upper right of the center "O" of the imaging plane 311A (FIG. 2). That is, the first right wide angle lens 211R forms a subject image in an area Ar1R (FIG. 2) on the upper right in the imaging plane 311A.

The second left wide angle lens 212L is a fixed focus wide angle lens, which is combined of a plurality of lens groups, has the same focal distance as those of the first left and right wide angle lenses 211L and 211R, and has a focus position at a near distance. That is, the second left wide angle lens 212L has a function as a first imaging optical system according to the present invention.

The second left wide angle lens 212L is supported by the lens barrel such that the second left wide angle lens 212L is postured and positioned as described below in the state where the optical device 2 has been attached to the imaging device 3.

The second left wide angle lens 212L is supported by the lens barrel such that the second left wide angle lens 211L is postured with its optical axis (illustration thereof omitted) being parallel to the optical axis AxL (being vertical to the imaging plane 311A) and positioned, as viewed from the subject side, on the lower left of the center "O" of the imaging plane 311A (FIG. 2). That is, the second left wide angle lens 212L forms a subject image in an area Ar2L (FIG. 2) on the lower left in the imaging plane 311A.

The second right wide angle lens 212R is a wide angle lens having the same function and configuration as the second left wide angle lens 212L and only a position, at which the second right wide angle lens 212R is arranged inside the lens barrel, is different from that of the second left wide angle lens 212L. That is, the second right wide angle lens 212R has a function as a first imaging optical system according to the present invention.

The second right wide angle lens 212R is supported by the lens barrel such that the second right wide angle lens 212R is postured with its optical axis (illustration thereof omitted) being parallel to the optical axis AxL (being vertical to the imaging plane 311A) and positioned, as viewed from the subject side, on the lower right of the center "O" of the imaging plane 311A (FIG. 2). That is, the second right wide angle lens 212R forms a subject image in an area Ar2R (FIG. 2) on the lower right in the imaging plane 311A.

The telephoto lens 213 is a telephoto lens that is combined of two lens groups (FIG. 4) and has a focal distance comparatively long with respect to its imaging range. This lens may be said as having a narrow view angle. That is, the telephoto lens 213 has a function as a second imaging optical system according to the present invention. This telephoto lens 213 is for largely shooting a far and small object that fully covers the view angle, and the view angle is stopped by limiting (narrowing), not only the actual focal distance, but also the imaging area to be used. As a result, many aberration correction lenses for suppressing aberration up to a periphery of a screen are not required to be provided, and thus designing with a comparatively simple configuration and less lenses becomes possible, and more downsizing as compared with the respective wide angle lenses 211L, 211R, 212L, and 212R becomes possible. Therefore, aberration correction dependent on the view angle is eased and small sized and low cost designs are enabled. A design with a short full length is enabled with the telephoto lens configuration illustrated in FIG. 4, in which the front group has a positive power and the rear group has a negative power. For example, in order to obtain the telephoto lens 213 corresponding to a 150-mm block of a screen resulting from vertical and horizontal division of the imaging element 311 into seven, designing with a total length corresponding to a wide angle lens of "140/7=20 mm" or less is possible.

An image quality by this lens having a narrow view angle (for telephotography) is able to be enhanced by various measures for improving qualities of images because a subject shot by this is also shootable via other lenses having a wide view angle. For example, distortion, a decrease in light quantity, or the like at a periphery of a screen is able to be corrected by referring to an image of a wide angle lens, and qualities of images are able to be improved by a super-resolution technique in the form of interpolating the image acquired by the wide angle lens. Since such correction effects are able to be expected, it may have a smaller configuration.

The telephoto lens 213 is supported by the lens barrel (illustration thereof omitted) such that the telephoto lens 213 is postured and positioned as described below in the state where the optical device has been attached to the imaging device 3.

The telephoto lens 213 is supported by the lens barrel such that the telephoto lens 213 is postured with its optical axis AxO being parallel to the optical axis AxL (being vertical to the imaging plane 311A) and is positioned at the center "O" of the imaging plane 311A as viewed from the subject side (FIG. 2). That is, the telephoto lens 213 forms a subject image in an area ArO (FIG. 2) at the center of the imaging plane 311A.

Further, although a specific illustration thereof has been omitted, the telephoto lens 213 is configured to be movable along the optical axis AxO inside the lens barrel. That is, the telephoto lens 213 is able to change a focus (focus position).

As described above, the telephoto lens 213 is arranged to be surrounded by the first left and right wide angle lenses 211L and 211R and the second left and right wide angle lenses 212L and 212R, as viewed from the subject side. Further, the first left and right wide angle lenses 211L and 211R and the second left and right wide angle lenses 212L and 212R are arranged at positions such that the first left and right wide angle lenses 211L and 211R and the second left and right wide angle lenses 212L and 212R have the same separation distance D1 from the imaging plane 311A (FIG. 5). The telephoto lens 213 is arranged at a position such that its separation distance D2 from the imaging plane 311A is shorter than the separation distance D1 (FIG. 5). In other words, the telephoto lens 213 is arranged at a position more separated from the subject than the first left and right wide angle lenses 211L and 211R and the second left and right wide angle lenses 212L and 212R. As a result, the telephoto lens 213 is prevented from protruding into a screen of each of the wide angle lenses 211L, 211R, 212L, and 212R and creating unnecessary dead angles or shadows. Further, an effect of a hood (for preventing flare) likely to be required for the telephoto lens 213 is able to be obtained by the protrusion of these wide angle lenses 211L, 211R, 212L, and 212R. Accordingly, since the protrusion of each of the wide angle lenses 211L, 211R, 212L, and 212R is allowed, by being configured of a retrofocus type or the like in which the front group has the negative power and the rear group has the positive power as illustrated in FIG. 3, lens setting with a short focal distance with respect to the full length is possible. For example, if one block resulting from vertical and horizontal division of the imaging element into three is used, in order to obtain a wide angle corresponding to 30 mm (by the 135 format conversion), the focal distance becomes "30/3=10 mm", but for retrofocusing, since a space equivalent to the focal distance is formed behind the rear group lenses, by arranging a plurality of lenses in front thereof, the full length is able to be designed to be equal to or greater than the wide angle lens.

The drive unit 22 is configured by using a stepping motor, a DC motor, or the like, and under control by the first control unit 26, moves the telephoto lens 213 along the optical axis AxO (changes the focus position of the telephoto lens 213).

The position detecting unit 23 is configured by using a photo-interrupter or the like, and detects a position of the telephoto lens 213 driven by the drive unit 22, the position being on the optical axis AxO.

The first recording unit 24 records therein a control program executed by the first control unit 26, characteristic information related to characteristics of each of the lenses 211L, 211R, 212L, 212R, and 213, and the like.

That is, the first recording unit 24 has a function as a characteristic information recording unit according to the present invention.

FIG. 6 is a diagram illustrating an example of the characteristic information recorded in the first recording unit 24.

The characteristic information is, for example, as illustrated in FIG. 6, information in which range information, optical axis coordinate information, focal distance information, focus adjustment information, use information, pair information, separation distance information, and the like are associated with each of the lenses 211L, 211R, 212L, 212R, and 213.

The range information is information related to a range occupied by the subject image formed on the imaging plane 311A by each of the lenses 211L, 211R, 212L, 212R, and 213, and is information corresponding to the above mentioned areas Ar1L, Ar1R, Ar2L, Ar2R, and ArO.

The optical axis coordinate information is information related to coordinates that the optical axis of each of the lenses 211L, 211R, 212L, 212R, and 213 passes on the imaging plane 311A. For example, the optical axis coordinate information of the telephoto lens 213 is information related to coordinates of the center "O" on the imaging plane 311A.

The focal distance information is information related to the focal distance of each of the lenses 211L, 211R, 212L, 212R, and 213. This focal distance information is easier to be understood if normalized in a particular imaging range, but may be numerical values convertible from the above described range information. Further, it may be view angle information, of course. Although not illustrated, information on the focusing range or the like, may be included, similarly. As a result, determination of a subject at which distance should be shot by which lens or the like becomes possible.

The focus adjustment information is information used when focus adjustment (autofocusing: AF) is performed, and is information in which a subject distance from the imaging system 1 (optical device 2) to the subject is associated with the position of the lens in a focused state. In the first optical device according to this first embodiment, a lens with its focus position being changeable is only the telephoto lens 213 and thus the focus adjustment information is associated only with the telephoto lens 213. Of course, the wide angle lenses 211L, 211R, 212L, and 212R also may have their focus positions adjustable to have this information. Further, information on the focusing range or the like may be also included therein. As a result, instead of displaying all of the plurality of images, control to display only those shot under appropriate focus conditions becomes possible. Similar things can be said for exposure, in addition to the focus positions.

The use information is information related to uses of the lenses 211L, 211R, 212L, 212R, and 213. Specifically, the use information is information related to whether of not the lens is a lens to be used when AF is performed. A plurality of fixed focus lenses are preferably used as lenses for AF with their focal distances or the like being at fixed values, because factors of errors upon AF applying triangulation are eliminated. The lenses for AF may not be in a pair and as long as their lens aperture is large, precision is expected to be increased by imaging plane phase difference AF with pixels for AF provided on the imaging element. Since a lens diameter of this telephoto lens 213 is small and this results in darkness, precision tends to lack in AF of this type, and thus AF applying triangulation is preferably combined therewith. In the first optical device according to this first embodiment, a pair of the first left and right wide angle lenses 211L and 211R or a pair of the second left and right wide angle lenses 212L and 212R is the lenses to be used when AF for the telephoto lens 213 is performed. Therefore, the use information is associated only with each of the lenses 211L, 211R, 212L, and 212R.

The pair information is information indicating the counterpart lens when the lens is used as the pair when AF or the like is performed. As described above, in the first optical device according to this first embodiment, the lenses used as the pair when AF of the telephoto lens 213 is performed, are the pair of the first left and right wide angle lenses 211L and 211R, or the pair of the second left and right wide angle lenses 212L and 212R. Therefore, the pair information of the first left wide angle lens 211L is information indicating the first right wide angle lens 211R, and the pair information of the first right wide angle lens 211R is information indicating the first left wide angle lens 211L. Further, the pair information of the second left wide angle lens 212L is information indicating the second right wide angle lens 212R, and the pair information of the second right wide angle lens 212R is information indicating the second left wide angle lens 212L.

The separation distance information is information related to the separation distance D1 (FIG. 5) of the first left and right wide angle lenses 211L and 211R and the second left and right wide angle lenses 212L and 212R from the imaging plane 311A. Therefore, the separation distance information is associated only with each of the lenses 211L, 211R, 212L, and 212R.

A second optical device having a single optical axis preferably has, of the above described information, the focal distance information (view angle information) and focus adjustment information, as well as diaphragm control information or the like.

The first communication unit 25 is a communication interface for electrically connecting to the imaging device 3 and performing communication with the imaging device 3, when the optical device 2 is attached to the imaging device 3.

The first control unit 26 is configured by using a central processing unit (CPU) or the like, and controls operations of the optical device 2 according to instruction signals from the imaging device 3, which are input via the first communication unit 25. Further, the first control unit 26 outputs, to the imaging device 3, a position of the telephoto lens 213 detected by the position detecting unit 23, via the first communication unit 25.

Configuration of Imaging Device

Hereinafter, main parts of the present invention will be mainly described, as a configuration of the imaging device 3.

The imaging device 3 includes, as illustrated in FIG. 1, an imaging unit 31, a display unit 32, an input unit 33, a second communication unit 34, a memory unit 35, a second recording unit 36, and a second control unit 37.

Under control by the second control unit 37, the imaging unit 31 images a subject and generates image data. This imaging unit 31 is configured by using: the imaging element 311 (FIG. 2 and FIG. 5), such as a charge coupled device (CCD), which receives a subject image formed by the imaging optical unit 21 and converts the subject image into an electrical signal; a signal processing unit (illustration thereof omitted), which generates digital image data by performing signal processing (A/D conversion or the like) on the electrical signal (analog signal) from the imaging element 311; and the like.

The image data generated by the imaging unit 31 are sequentially stored, under control by the second control unit 37, into the memory unit 35. Further, if a shooting operation is performed on the input unit 33 by a user of the imaging system 1, under control by the second control unit 37, the image data generated by the imaging unit 31 (image data corresponding to a part of an image area according to the shooting operation if the first optical device is attached (hereinafter, "partial image data"), and image data corresponding to approximately the whole of the image area in the image data if the second optical device is attached) are recorded in the second recording unit 36.

The display unit 32 is configured by using a display panel made of a liquid crystal, organic electro-luminescence (EL), or the like, and displays, under control by the second control unit 37, various images. Further, the display unit 32 displays, under control by the second control unit 37, operation information of the imaging system 1, information related to shooting, and the like, as appropriate.

The input unit 33 is configured by using buttons, switches, a touch panel, or the like for receiving user operations, and outputs instruction signals according to the user operations to the second control unit 37.

The second communication unit 34 is a communication interface for electrically connecting to the optical device 2 and performing communication with the first communication unit 25, when the optical device 2 is attached to the imaging device 3.

The memory unit 35 stores therein the image data generated by the imaging unit 31, characteristic information received via the second communication unit 34, and the like.

The second recording unit 36 includes, as illustrated in FIG. 1, a program recording unit 361 and an image data recording unit 362.

The program recording unit 361 stores therein various programs executed by the second control unit 37, various data used during the execution of the programs, and the like.

The image data recording unit 362 records therein, under control by the second control unit 37, image data (the partial image data if the first optical device is attached and the image data corresponding to approximately the whole of the image area of the image data if the second optical device is attached) according to the shooting operation on the input unit 33 by a user of the imaging system 1. For this shooting operation, the touch panel (input unit 33) on the display unit 32 may be used, and the shooting operation is able to be selected easily if a necessary image is specified on the display screen. Further, on the touch panel, a necessary range of an image may be specified. For example, a slide operation may be detected as a frame or an area may be made to be able to be specified by a pinch operation. If such means are used, without taking out and displaying a particular area (for example, the above described area Ar1L, Ar1R, Ar2L, Ar2R, or ArO) specified by the optical device 2 from an image captured by the imaging element 311, a valid area of each lens may be made to be able to be specified manually. If focusing and exposure adjustment are enabled by these touch operations also in a second optical device having a single optical axis, operations by similar actions become possible. Further, trimming or the like may be made possible from an image acquired by a second optical device having a single optical axis by a similar pinch operation or the like.

The second control unit 37 is configured by using a CPU or the like, and comprehensively controls operations of the imaging system 1 by performing transfer or the like of instructions and data corresponding to respective units forming the imaging system 1 according to the instruction signals or the like from the input unit 33. This second control unit 37 includes, as illustrated in FIG. 1, a characteristic information acquiring unit 371, a lens position instructing unit 372, an image extracting unit 373, a display control unit 374, and an imaging control unit 375.

The characteristic information acquiring unit 371 acquires characteristic information from the optical device 2 by requesting the optical device 2 to transmit the characteristic information, via the second communication unit 34. The characteristic information acquiring unit 371 stores the acquired characteristic information in the memory unit 35.

The lens position instructing unit 372 executes, as described below, an AF process of a lens for which the focus position is changeable (the telephoto lens 213 in the first optical device according to this first embodiment), of the lenses included in the optical device 2.

Specifically, the lens position instructing unit 372 calculates, based on the characteristic information and the latest image data stored in the memory unit 35, a subject distance from the imaging system 1 (optical device 2) to the subject. Further, the lens position instructing unit 372 acquires, based on focus adjustment information included in the characteristic information stored in the memory unit 35, a position of the telephoto lens 213 on its optical axis ArO corresponding to the calculated subject distance. The lens position instructing unit 372 then transmits positional information related to the acquired position of the telephoto lens 213 to the optical device 2 via the second communication unit 34.

Specifically, the lens position instructing unit 372 calculates the subject distance, as described below, by using the principle of triangulation.

Figure 7:
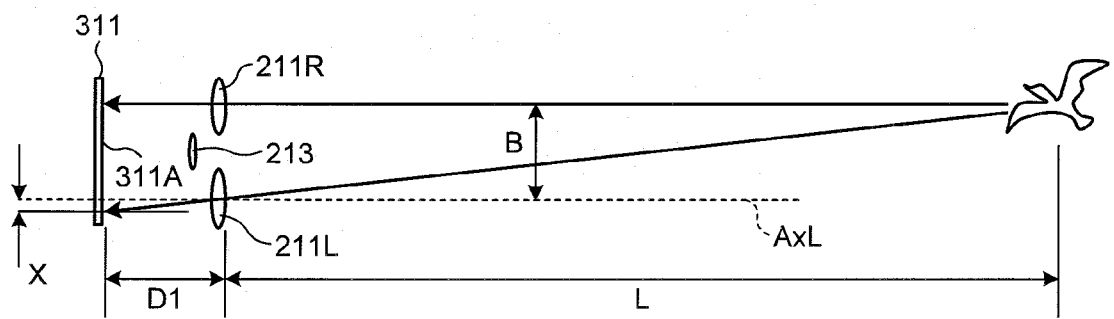
FIG. 7 is a diagram illustrating a process of calculating a subject distance by a lens position instructing unit illustrated in FIG. 1.

FIG. 7 is a diagram illustrating a process of calculating the subject distance by the lens position instructing unit 372. Specifically, FIG. 7 is, similarly to FIG. 5, a diagram of the imaging system 1 as viewed from above.

First, the lens position instructing unit 372 identifies, based on the use information and pair information included in the characteristic information stored in the memory unit 35, the lenses forming the pair to be used in performing AF of the telephoto lens 213 (the pair of the first left and right wide angle lenses 211L and 211R, or the pair of the second left and right wide angle lenses 212L and 212R).

In the following description, the lenses forming that pair are assumed to be identified as the first left and right wide angle lenses 211L and 211R.

Next, the lens position instructing unit 372 recognizes, based on the range information included in the characteristic information stored in the memory unit 35, the areas Ar1L and Ar1R where the first left and right wide angle lenses 211L and 211R form their subject images in the imaging plane 311A.

Next, the lens position instructing unit 372 reads the latest image data stored in the memory unit 35, and calculates a position (coordinates) of the subject image ("bird" in the example of FIG. 7) photographed in the area Ar1L or the area Ar1R in the image area of the latest image data.

Next, the lens position instructing unit 372 recognizes, based on the optical axis coordinate information included in the characteristic information stored in the memory unit 35, coordinates of the optical axes AxL and AxR of the first left and right wide angle lenses 211L and 211R. The lens position instructing unit 372 then calculates a distance "B"

between the recognized coordinates and calculates a deviation amount "X" between the coordinates of the optical axis AxL or optical axis AxR (the optical axis AxL in the example of FIG. 7) and the above described calculated position of the subject image.

Next, the lens position instructing unit 372 recognizes, based on the separation distance information included in the characteristic information stored in the memory unit 35, a separation distance D1 of the first left and right wide angle lenses 211L and 211R from the imaging plane 311A.

After the above processing, the lens position instructing unit 372 calculates, based on the following Equation (1), a subject distance "L".

$$L = B \cdot X / D1 \qquad (1)$$

The image extracting unit 373 reads the latest image data stored in the memory unit 35. The image extracting unit 373 then extracts, based on the range information included in the characteristic information stored in the memory unit 35, partial image data corresponding to each of areas based on the range information in the image area of the latest image data (the areas Ar1L, Ar1R, Ar2L, Ar2R, and ArO in the first optical device according to this first embodiment). Further, the image extracting unit 373 stores the partial image data in association with their corresponding characteristic information in the memory unit 35 in order to make the extracted partial image data identifiable. For example, the image extracting unit 373 stores the partial image data of the area Ar1L in association with the characteristic information of the first left wide angle lens 211L corresponding thereto, in the memory unit 35.

The display control unit 374 controls operations of the display unit 32 and causes the display unit 32 to display images.

Figure 8:
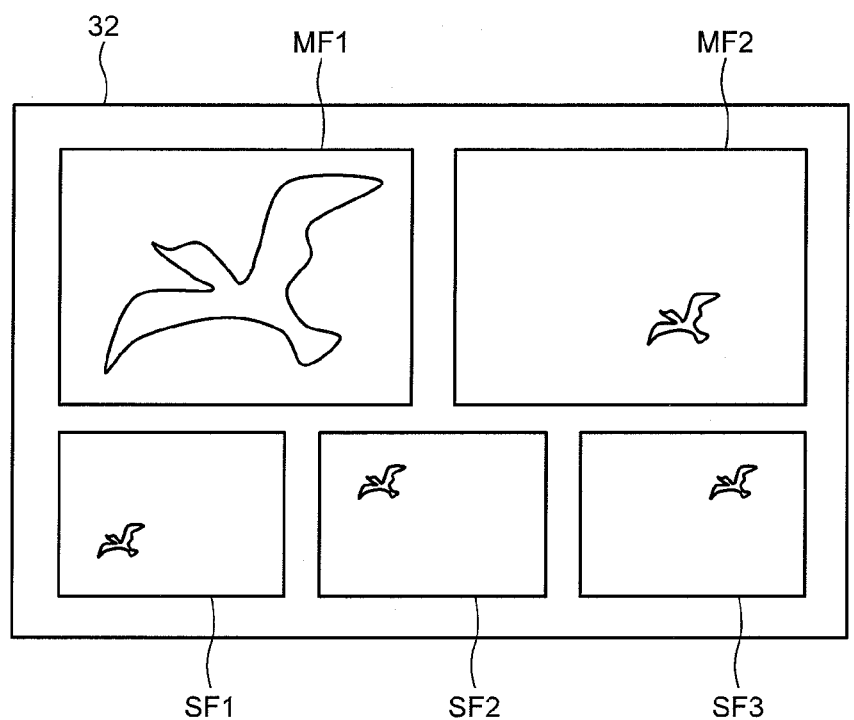
FIG. 8 is a diagram illustrating an example of images displayed by a display unit illustrated in FIG. 1.

FIG. 8 is a diagram illustrating an example of the images displayed by the display unit 32. In FIG. 8, similarly to FIG. 5 and FIG. 7, the subject is "bird".

Specifically, the display control unit 374 identifies, based on the characteristic information associated with each partial image data stored in the memory unit 35, those corresponding partial image data. As illustrated in FIG. 8, the display control unit 374 causes the display unit 32 to display (live view display) each of: first representative image MF1, which is an image corresponding to the partial image data of the area ArO; a second representative image MF2, which is an image corresponding to the partial image data of one of the areas Ar1L, Ar1R, Ar2L, and Ar2R (for example, the partial image data that are in a focused state, of the partial image data of the areas Ar1L, Ar1R, Ar2L, and Ar2R); and sub images SF1 to SF3, which are images corresponding to the partial image data of the other three of the areas Ar1L, Ar1R, Ar2L, and Ar2R, the images having a size smaller than those of the first and second representative images MF1 and MF2, by lining up these images MF1, MF2, and SF1 to SF3. The respective images MF1, MF2, and SF1 to SF3 may be not displayed by being lined up, and may be sequentially displayed by being switched over with one another.

If a shooting operation (an operation of selecting any of the respective images MF1, MF2, and SF1 to SF3 displayed by the display unit 32) on the input unit 33 by a user of the imaging system 1 is performed, the imaging control unit 375 records the partial image data corresponding to the selected image in the image data recording unit 362. When that is done, a plurality of images may be caused to be able to be synthesized and recorded. Further, an image once selected may be controlled to be prioritized in the next shooting. Furthermore, an image quality by a lens having a narrow view angle (for telephotography) is able to be enhanced by various measures for improving qualities of images because a subject shot by this is also shootable via other lenses having a wide view angle. For example, distortion, a decrease in light quantity, or the like at a periphery of a screen is able to be corrected by referring to an image of a wide angle lens, and qualities of images are able to be improved by a super-resolution technique in the form of interpolating the image acquired by the wide angle lens. Since such correction effects are able to be expected, it may have a smaller configuration. Similarly, needless to say, by using images acquired by a plurality of lenses, image qualities of images by wide angle lenses are able to be improved and application of processing the images into a panoramic image or a three dimensional image is possible. This may be performed by the display control unit 374 or the like of the imaging device 3, and may be aided by providing a dedicated circuit in the second control unit 37 or recording a dedicated image processing program in the program recording unit 361. The image quality may be improved when the image data are recorded, and application of transmitting the image data to the outside and improving the image quality at an external device is also possible. By the three dimensional information, artistic expression or the like added with depth information becomes possible and even richer image expression is realized.

Operations of Imaging System

Next, operations of the above described imaging system 1 will be described.

For the operations described below, the optical device 2 is assumed to be already attached to the imaging device 3.

Figure 9:
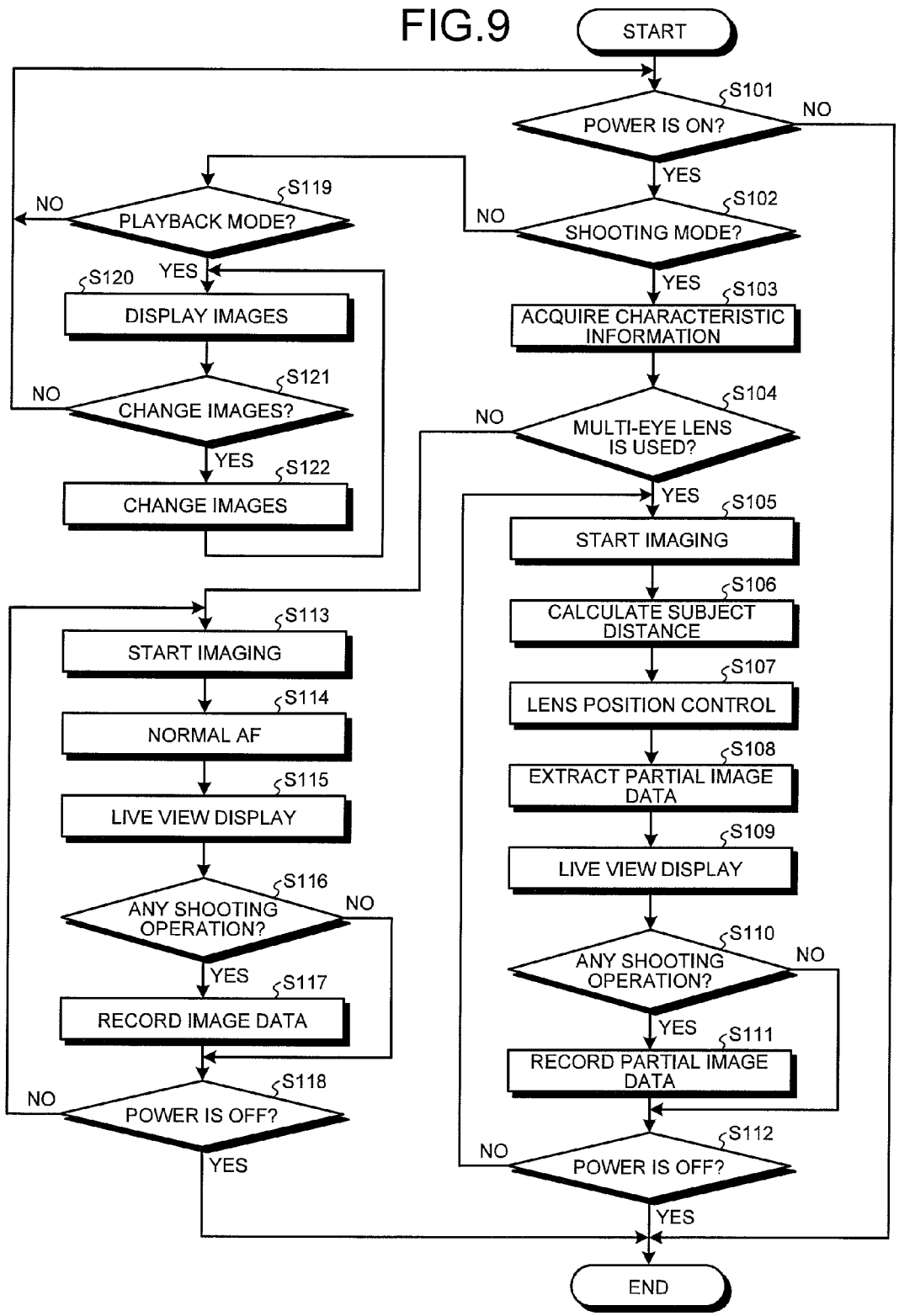
FIG. 9 is a flow chart illustrating operations of the imaging system illustrated in FIG. 1.

FIG. 9 is a flow chart illustrating the operations of the imaging system 1.

If power of the imaging system 1 is turned ON by an operation on the input unit 33 by a user of the imaging system 1 (Step S101: Yes), the second control unit 37 determines whether or not the imaging system 1 has been set in a shooting mode by an operation on the input unit 33 by the user of the imaging system 1 (Step S102).

If the imaging system 1 is determined to have been set in the shooting mode (Step S102: Yes), the characteristic information acquiring unit 371 requests the optical device 2, via the second communication unit 34, to transmit the characteristic information. The optical device 2 (first control unit 26) that has received that transmission request transmits, via the first communication unit 25, the characteristic information recorded in the first recording unit 24, to the imaging device 3. The characteristic information acquiring unit 371 acquires the characteristic information from the optical device 2 and stores the characteristic information in the memory unit 35 (Step S103).

Subsequently, the second control unit 37 determines whether or not the optical device 2 that has been attached to the imaging device 3 is a first optical device (whether or not a multi-eye lens is used) (Step S104). For example, the second control unit 37 determines, based on the characteristic information acquired in Step S103, that a multi-eye lens is used, if plural sets of characteristic information are present correspondingly with the respective lenses included in the imaging optical unit. That is, the second control unit 37 determines whether or not a multi-eye lens is used (whether a first optical device is attached or a second optical device is attached) by communicating information with the optical device 2 (Step S103).

Depending on the optical device 2, such a shooting device or system may be configured by using a fixed focus lens group not electrically controlled. In this case, similar effects are obtained even if electrical information communication is not performed. For example, from features of an acquired image or the like, whether or not a multi-eye lens is used may be determined from an image captured by the imaging element 311. When that is done, by providing means, such as designing a predetermined position to be at the optical center or selecting and inputting a lens type, an imaging device (camera) that obtains the original effects of the present invention is able to be provided with a simple configuration. For a camera having a touch panel type display unit, a necessary area may be selected from an acquired image on the touch panel. The electrical communication may be performed restrictively, and means for displaying a distance of a subject from information of an image acquired by a pair of lenses or for performing focus assisting display may be provided. In this case, the final focusing is performed by a user performing manual adjustment while viewing the display. Further, a plurality of images are acquired by the imaging element 311 from a first optical device having a plurality of optical systems having different optical axes, but according to characteristics and the result of adjustment of each optical system, each image has a different image quality, such as a different exposure, a different focus, or the like, and thus setting of which image is to be valid is important. Further, in an imaging element or the like that is able to perform a different imaging process for each image, depending on the taste, image processing and imaging control for each area become important. Therefore, in such a multi-eye system, a function of selecting an area becomes important. From the view point of area selection, if focusing and exposure adjustment are enabled by this touch operation also in a second optical device having a single optical axis, operations by similar actions become possible. Further, trimming or the like may be made possible from an image acquired by a second optical device having a single optical axis by a similar pinch operation or the like. In this case, the electrical communication may be performed or not performed, but if focusing is to be automatically performed or a diaphragm is desired to be controlled from the imaging device side, electrical communication is preferably made available. Where each image is acquired for each optical axis upon this multi-eye use is able to be determined at the imaging device side by performing image determination or the like of whether the optical axis directions are approximately equal to one another, or whether similar images are arranged according to a particular rule. For example, for a multi-eye lens like that of FIG. 2 or FIG. 18, since lenses of similar specifications are arranged on a diagonal line, if similar images are arranged on a diagonal line, a multi-eye lens is determined to be used, and since light does not reach between lenses and this results in darkness, from image information indicating regular occurrences of dark portions or the like, camera control of automatically determining a valid area of each image of the multi-eye lens may be performed. This may be simplified by a service, such as that for downloading a control program for each lens. For such a downloading system, if communicatable with the optical device 2, a result of the communication may be prioritized, and if not communicatable, download information may be prioritized. In any case, not all of the information illustrated in FIG. 6 needs to be communicated.

If a multi-eye lens is determined to be used (Step S104: Yes), the second control unit 37 causes the imaging unit 31 to start imaging (Step S105). Image data generated by the imaging unit 31 are then sequentially stored in the memory unit 35.

Subsequently, the lens position instructing unit 372 calculates a subject distance, based on the characteristic information and the latest image data stored in the memory unit 35 (Step S106), and transmits, based on the focus adjustment information included in the characteristic information, positional information of the telephoto lens 213 corresponding to the calculated subject distance (Step S107). While checking the position of the telephoto lens 213 on the optical axis AxO detected by the position detecting unit 23, the optical device 2 (first control unit 26) that has received the positional information of the telephoto lens 213 causes the drive unit 22 to operate to position the telephoto lens 213 at a position based on the received positional information.

Subsequently, the image extracting unit 373 reads the latest image data stored in the memory unit 35 and respectively extracts, based on the range information included in the characteristic information stored in the memory unit 35, the partial image data corresponding to the areas Ar1L, Ar1R, Ar2L, Ar2R, and ArO in the image area of the latest image data (Step S108). Further, the image extracting unit 373 stores the extracted partial image data in association with their corresponding characteristic information into the memory unit 35.

Subsequently, the display control unit 374 identifies, based on the characteristic information associated with each partial image data stored in the memory unit 35, those corresponding partial image data, and causes the display unit 32 to perform live view display (FIG. 8) thereof (Step S109).

In the live view display illustrated in FIG. 8, the image corresponding to the partial image data of the area ArO is the first representative image MF1, the image corresponding to the partial image data of any one of the areas Ar1L, Ar1R, Ar2L, and Ar2R is the second representative image MF2, and images corresponding to the partial image data of the other three of the areas Ar1L, Ar1R, Ar2L, and Ar2R are the sub images SF1 to SF3, but not being limited thereto, for example, according to operations on the input unit 33 by a user of the imaging system 1, images to be the first and second representative images and sub images may be configured to be changeable as appropriate. Further, sizes of the first and second representative images and sub images may be configured to be changeable as appropriate according to those operations.

Subsequently, the imaging control unit 375 determines whether or not a shooting operation on the input unit 33 by a user of the imaging system 1 has been performed (Step S110).

If it is determined that there has not been any shooting operation (Step S110: No), the imaging system 1 proceeds to Step S112.

On the contrary, if the imaging control unit 375 determines that there has been a shooting operation (Step S110: Yes), the imaging control unit 375 records the partial image data corresponding to the image selected by the shooting operation, of the images displayed by the display unit 32 (in the example of FIG. 8, the images MF1, MF2, and SF1 to SF3) into the image data recording unit 362 (Step S111).

After Step S111, or after it is determined, "No", in Step S110, if the power of the imaging system 1 is turned OFF by an operation on the input unit 33 by a user of the imaging system 1 (Step S112: Yes), the imaging system 1 ends this process.

On the contrary, if the state where the power is ON is continuing (Step S112: No), the imaging system 1 returns to Step S105.

If it is determined that a multi-eye lens is not used (that a second optical device having a single optical axis is used)

(Step S104: No), the second control unit 37 causes, similarly to Step S105, the imaging unit 31 to start imaging (Step S113), executes a normal AF process conventionally known widely (Step S114), and executes live view display (Step S115).

For the live view display (Step S115), the second control unit 37 causes the display unit 32 to display the image corresponding to the latest image data (the image of approximately the whole image area) stored in the memory unit 35 in Step S113.

Subsequently, the imaging control unit 375 determines whether or not a shooting operation on the input unit 33 by a user of the imaging system 1 has been performed (Step S116).

If it is determined that there has not been any shooting operation (Step S116: No), the imaging system 1 proceeds to Step S118.

On the contrary, if the imaging control unit 375 determines that there has been a shooting operation (Step S116: Yes), the imaging control unit 375 records the image data corresponding to the image, which the display unit 32 was caused to display upon the shooting operation, into the image data recording unit 362 (Step S117).

After Step S117, or after it is determined, "No", in Step S116, if the power of the imaging system 1 is turned OFF by an operation on the input unit 33 by a user of the imaging system 1 (Step S118: Yes), the imaging system 1 ends this process.

On the contrary, if the state where the power is ON is continuing (Step S118: No), the imaging system 1 returns to Step S113.

As described above, the imaging device 3 (the second control unit 37) according to this first embodiment changes the imaging control and the display control between the time of attaching the first optical device and the time of attaching the second optical device by executing Steps S105 to S111 when the first optical device is attached to the imaging device 3 and executing Steps S113 to S117 when the second optical device is attached to the imaging device 3.

That is, the imaging system 1 has functions as an imaging system and a display system according to the present invention. Further, the imaging device 3 has functions as an imaging device and a display device according to the present invention. Further, the second control unit 37 has a function as a control unit according to the present invention.

If it is determined that the imaging system 1 has not been set in the shooting mode (Step S102: No), the second control unit 37 determines whether or not the imaging system 1 has been set in a playback mode by an operation on the input unit 33 by a user of the imaging system 1 (Step S119).

If it is determined that the imaging system 1 has not been set in the playback mode (Step S119: No), the imaging system 1 returns to Step S101.

On the contrary, if it is determined that the imaging system 1 has been set in the playback mode (Step S119: Yes), the display control unit 374 causes the display unit 32 to display the images corresponding to the image data and partial image data, which have been recorded in the image data recording unit 362 (Step S120).

Subsequently, the display control unit 374 determines whether or not an instruction signal instructing a change of images has been input by an operation on the input unit 33 by a user of the imaging system 1 (Step S121).

If the display control unit 374 determines that the instruction signal instructing a change of images has been input (Step S121: Yes), the display control unit 374 changes the images to be displayed by the display unit 32 (Step S122). After Step S122, the imaging system 1 returns to Step S120.

On the contrary, if it is determined that the instruction signal instructing a change of images has not been input (Step S121: No), the imaging system 1 returns to Step S101.

The imaging device 3 according to this first embodiment includes the above described second control unit 37. That is, an effect of being able to freely use the first and second optical devices to enjoy subject images with various expressions is achieved by the second control unit 37 changing the imaging control and display control between the time of attaching the first optical device to the imaging device 3 and the time of attaching the second optical device to the imaging device 3.

Further, the imaging device 3 according to this first embodiment determines that the first or second optical device has been attached to the imaging device 3 by the information communication with the optical device 2 and the images captured by the imaging element 311, and thus whether the first or second optical device has been attached is able to be determined easily and accurately.

Further, the first optical device according to this first embodiment includes the imaging optical unit 21, which has the first left and right wide angle lenses 211L and 211R, the second left and right wide angle lenses 212L and 212R, and the telephoto lens 213, and the first recording unit 24, which records therein the characteristic information related to the characteristics of each of the lenses 211L, 211R, 212L, 212R, and 213.

Therefore, even if the first optical device is configured as an interchangeable lens, the imaging device 3 is able to grasp the characteristics of each of the lenses 211L, 211R, 212L, 212R, and 213 by acquiring the characteristic information recorded in the first recording unit 24. In particular, the characteristic information includes the range information related to the ranges occupied by the respective subject images formed on the imaging plane 311A of the imaging element 311 by the respective lenses 211L, 211R, 212L, 212R, and 213 (the areas Ar1L, Ar1R, Ar2L, Ar2R, and ArO). That is, based on the range information included in the characteristic information, the imaging device 3 is able to grasp in which range of the imaging plane 311A of the imaging element 311 each of the lenses 211L, 211R, 212L, 212R, and 213 will form the subject image, and by performing image processing (extraction of the partial image data corresponding to the areas Ar1L, Ar1R, Ar2L, Ar2R, and ArO), generation and display of various images (for example, the images MF1, MF2, and SF1 to SF3 illustrated in FIG. 8) become possible.

Therefore, by the first optical device according to this first embodiment, effects similar to those of the imaging device 3 as described above are achieved.

Further, in the first optical device according to this first embodiment, the characteristic information includes the pair information indicating the counterpart lens used as the pair when AF of the telephoto lens 213 is performed.

Therefore, based on the pair information and range information included in the characteristic information, the imaging device 3 is able to distinguish easily which partial image data need to be used when AF of the telephoto lens 213 is performed and is able to execute the AF of the telephoto lens 213 quickly.

In particular, since the telephoto lens 213 has a shallow depth of field, performing AF as described above is very effective.

Further, in the first optical device according to this first embodiment, the telephoto lens 213, which has a narrow view angle, is arranged at the center, and each of the wide angle lenses 211L, 211R, 212L, and 212R, which has a wide view angle, is arranged to surround the telephoto lens 213, as viewed from the subject side.

Therefore, in all of the images (partial image data) formed by the respective lenses 211L, 211R, 212L, 212R, and 213, the same subject image (for example, the bird illustrated in FIG. 5 and FIG. 7) is able to be included.

In particular, the telephoto lens 213 is arranged at a position more separate from the subject than each of the wide angle lenses 211L, 211R, 212L, and 212R. Therefore, the view angle of each of the wide angle lenses 211L, 211R, 212L, and 212R is prevented from being confined by the telephoto lens 213, and optimum arrangement not causing vignetting in each image (partial image data) is able to be realized.

Second Embodiment

Next, a second embodiment of the present invention will be described.

In the description below, to configurations and steps similar to those of the above described first embodiment, the same signs will be appended, and detailed description thereof will be omitted or simplified.

An imaging device according to this second embodiment has a mode of displaying images, which is different from that of the imaging system 1 described above in the first embodiment.

Hereinafter, a configuration of an imaging system according to this second embodiment will be described.
Configuration of Imaging System FIG. 10 is a block diagram illustrating a configuration of an imaging system 1A according to the second embodiment of the present invention.

Figure 10:
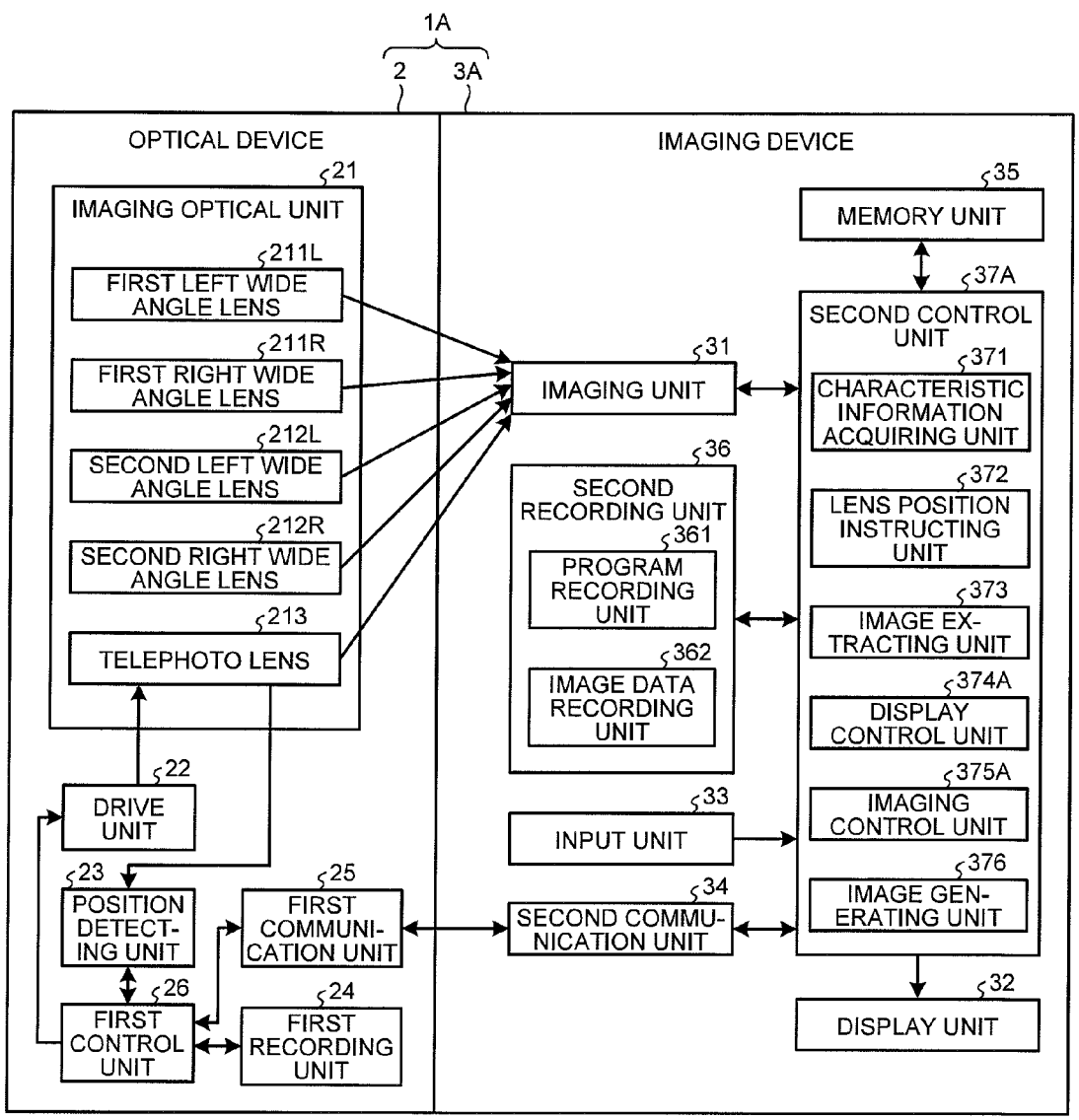
FIG. 10 is a block diagram illustrating a configuration of an imaging system according to a second embodiment of the present invention.

A second control unit 37A included in the imaging system 1A (imaging device 3A) according to this second embodiment has, as illustrated in FIG. 10, an image generating unit 376 added, as compared to the imaging system 1 (FIG. 1) described above in the first embodiment.

The image generating unit 376 reads, based on the pair information included in the characteristic information associated with the respective partial image data stored in the memory unit 35, the respective partial image data corresponding to the lenses used as a pair (the pair of the first left and right wide angle lenses 211L and 211R, or the pair of the second left and right wide angle lenses 212L and 212R). The image generating unit 376 then synthesizes the respective images corresponding to the read respective partial image data to generate a panoramic image, and stores panoramic image data corresponding to the panoramic image into the memory unit 35.

That is, the image generating unit 376 has a function as a panoramic image generating unit according to the present invention.

A display control unit 374A and an imaging control unit 375A according to this second embodiment have some of their functions being changed according to the addition of the above described image generating unit 376, as compared to the display control unit 374 and the imaging control unit 375 described above in the first embodiment.
Operations of Imaging System Next, operations of the imaging system 1A according to this second embodiment will be described.

Figure 11:
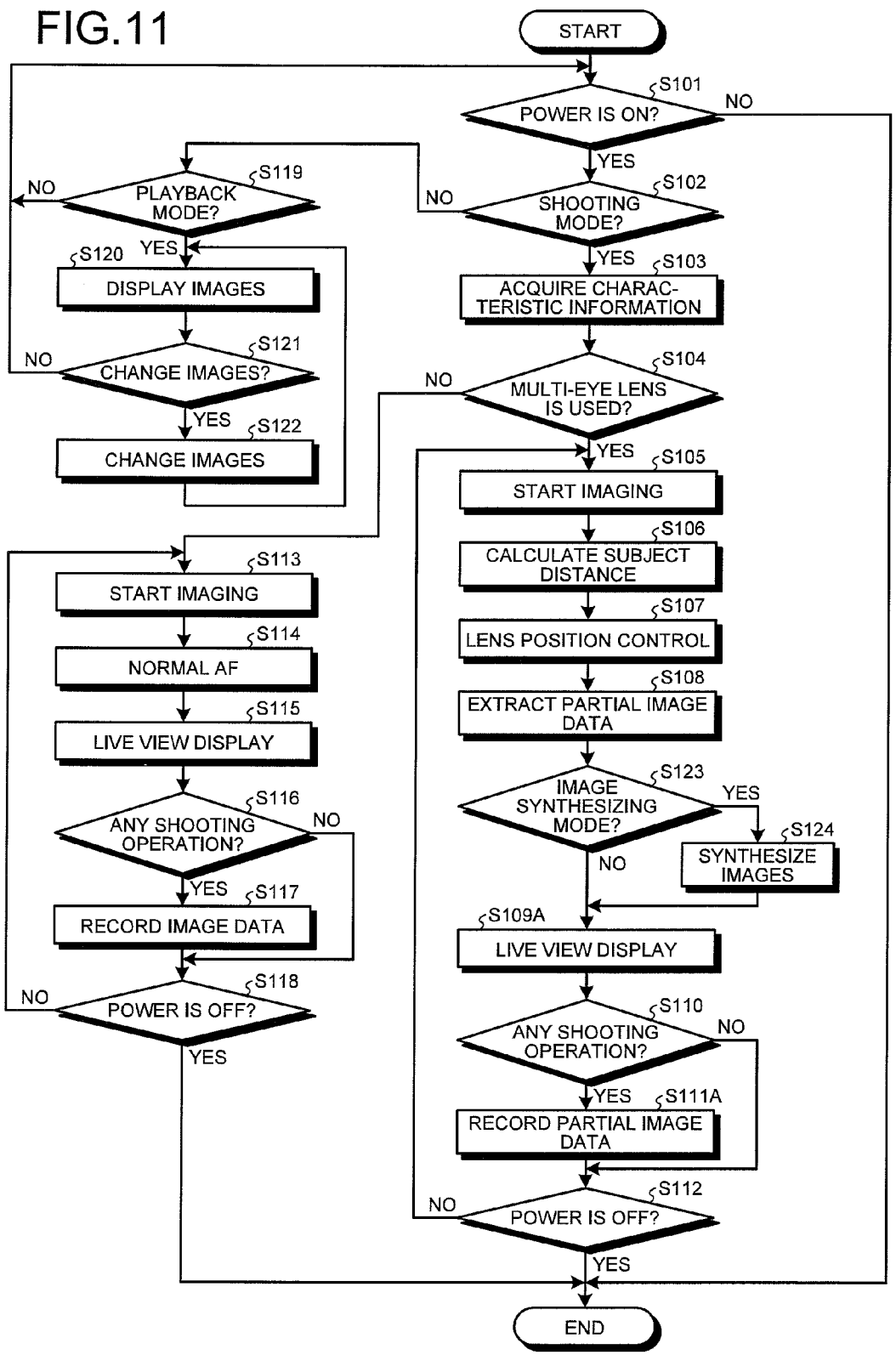
FIG. 11 is a flow chart illustrating operations of the imaging system illustrated in FIG. 10.

FIG. 11 is a flow chart illustrating the operations of the imaging system 1A.

The operations of the imaging system 1A according to this second embodiment are, as illustrated in FIG. 11, different from the operations of the imaging system 1 described above in the second embodiment (FIG. 9) in that Steps S123 and S124 are added and Steps S109A and S111A are used instead of Steps S109 and S111.

Therefore, hereinafter, only Steps S123, S124, S109A, and S111A will be described.

Step S123 is executed after Step S108.

Specifically, the second control unit 37A determines whether or not the imaging system 1A has been set in an image synthesizing mode by an operation on the input unit 33 by a user of the imaging system 1A (Step S123).

If it is determined that the imaging system 1A has been set in the image synthesizing mode (Step S123: Yes), the image generating unit 376 reads, based on the pair information included in the characteristic information associated with each partial image data stored in the memory unit 35 in Step S105, the respective partial image data corresponding to the first left and right wide angle lenses 211L and 211R used as the pair. The image generating unit 376 then synthesizes the respective images corresponding to the read respective partial image data (the respective images of the areas Ar1L and Ar1R) to generate a panoramic image, and stores panoramic image data corresponding to the panoramic image into the memory unit 35 (Step S124).

On the contrary, if it is determined that the imaging system 1A has not been set in the image synthesizing mode (Step S123: No), the imaging system 1A returns to Step S109A.

After Step S124, or after it is determined, "No", in Step S123, the display control unit 374A causes the display unit 32 to perform live view display (Step S109A).

The live view display (Step S109A) in the case where the imaging system 1A has not been set in the image synthesizing mode (Step S123: No) is processed similarly to the live view display (Step S109 described above in the first embodiment (for example, see FIG. 8).

The live view display (Step S109A) in the case where the imaging system 1A has been set in the image synthesizing mode (Step S123: Yes) is as follows.

Figure 12:
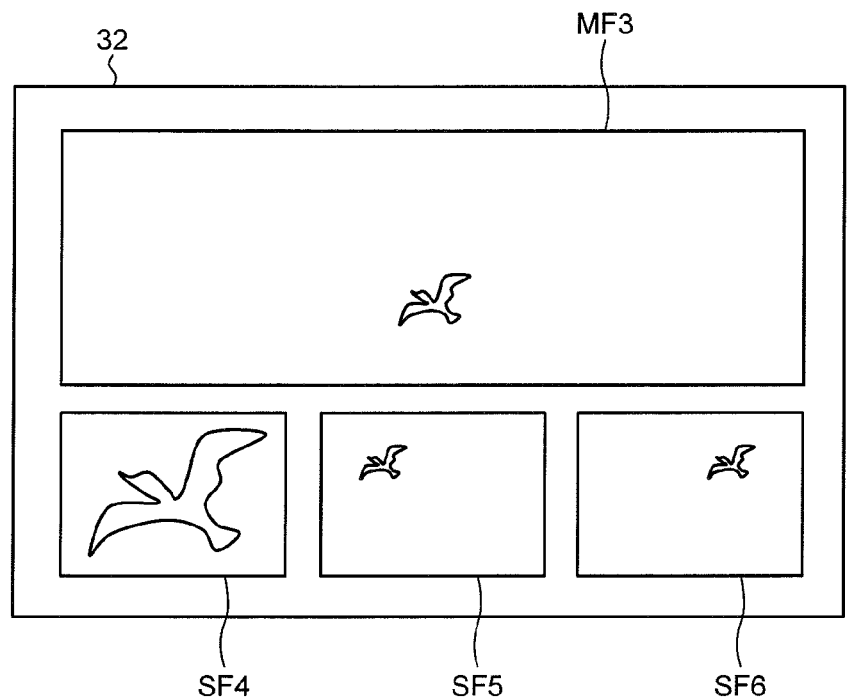
FIG. 12 is a diagram illustrating an example of images displayed by a display unit in an image synthesizing mode.

FIG. 12 is a diagram illustrating an example of images live view displayed by the display unit 32 in the image synthesizing mode.

Specifically, the display control unit 374A identifies, based on the characteristic information associated with each partial image data stored in the memory unit 35, the corresponding partial image data. As illustrated in FIG. 12, the display control unit 374A causes the display unit 32 to display (live view display) each of: a third representative image MF3, which is an image corresponding to the panoramic image data stored in the memory unit 35; and sub images SF4 to SF6, which are images corresponding to the areas ArO, Ar2L, and Ar2R not used in the generation of the panoramic image by the image generating unit 376, the images having a size smaller than that of the third representative image MF3, by lining up these respective images MF3 and SF4 to SF6. The respective images MF3 and SF4 to SF6 may be not displayed by being lined up, and may be displayed sequentially by being switched over with one another.

In the live view display illustrated in FIG. 12, the image corresponding to the panoramic image data is the third representative image MF3 and the images corresponding to the areas ArO, Ar2L, and Ar2R not used in the generation of the panoramic image are the sub images SF4 to SF6, but not being limited thereto, for example, images to become the third representative image and sub images may be configured to be changeable as appropriate according to operations on the input unit 33 by a user of the imaging system 1A. Further, according to those operations, sizes of the third representative image and sub images may be configured to be changeable as appropriate.

If the imaging control unit 375A determines that a shooting operation has been performed (Step S110: Yes), the imaging control unit 375A records, into the image data recording unit 362, the panoramic image data or the partial image data corresponding to the image selected by the shooting operation from the images displayed by the display unit 32 (the images MF1, MF2, and SF1 to SF3 illustrated in the example of FIG. 8 if not set in the image synthesizing mode and the images MF3 and SF4 to SF6 illustrated in the example of FIG. 12 if set in the image synthesizing mode) (Step S108A).

Similarly to the above described first embodiment, in this second embodiment also, the characteristic information of whether the optical device 2 attached is a first optical device or a second optical device may be acquired by electrical communication with the optical device 2. Depending on the optical device 2, such a shooting device or system maybe configured by using a fixed focus lens group not electrically controlled. In this case, from features or the like of acquired images, whether or not a multi-eye lens (first optical device) has been attached may be determined, and characteristics thereof may be determined from images captured by the imaging element 311. Where each image is acquired for each optical axis upon use of this multi-eye lens is able to be determined at the imaging device (camera) side by performing image determination or the like of whether the optical axis directions are approximately equal to one another, or whether similar images are arranged according to a particular rule. For example, for a multi-eye lens like that of FIG. 2 or FIG. 18, since lenses of similar specifications are arranged on a diagonal line, if similar images are arranged on a diagonal line, a multi-eye lens is determined to be used, and since light does not reach between lenses and this results in darkness, from image information indicating regular occurrences of dark portions or the like, camera control of automatically determining a valid area of each image of the multi-eye lens may be performed. This may be simplified by a service, such as that for downloading a control program for each lens. For such a downloading system, if communicatable with the optical device 2, a result of the communication may be prioritized, and if not communicatable, download information may be prioritized. In any case, not all of the information illustrated in FIG. 6 needs to be communicated. By providing means, such as designing a predetermined position to be at the optical center or selecting and inputting a lens type, a camera that obtains the original effects of the present invention is able to be provided with a simple configuration. For a camera having a touch panel type display unit, a necessary area may be caused to be selected from an acquired image on the touch panel. The electrical communication may be performed restrictively, and measures for displaying a distance of a subject from information of an image acquired by a pair of lenses or for performing focus assisting display may be provided. In this case, the final focusing is performed by the user performing manual adjustment while viewing the display. Further, a plurality of images are acquired by the imaging element 311 from a first optical device having a plurality of optical systems having different optical axes, but each image has a different image quality, such as a different exposure, a different focus, or the like, according to characteristics and the result of adjustment of each optical system, each image has a different image quality, such as a different exposure, a different focus, or the like, and thus setting of which image is to be valid is important. Further, in an imaging element or that like that is able to perform a different imaging process for each image, depending on the taste, image processing and imaging control for each area become important. Therefore, in such a multi-eye system, a function of selecting an area becomes important. From the view point of area selection, if focusing and exposure adjustment are enabled by this touch operation also in a second optical device having a single optical axis, operations by similar actions become possible. Further, trimming or the like may be enabled from an image acquired by a second optical device having a single optical axis by a similar pinch operation or the like. In this case, the electrical communication may be performed or not performed, but if focusing is to be automatically performed or a diaphragm is desired to be controlled from the imaging device side, electrical communication is preferably made available.

Even with a configuration in which a panoramic image is generated and displayed as described above in this second embodiment, effects similar to those of the above described first embodiment are able to be achieved.

Modified Example of Second Embodiment

Figure 13:
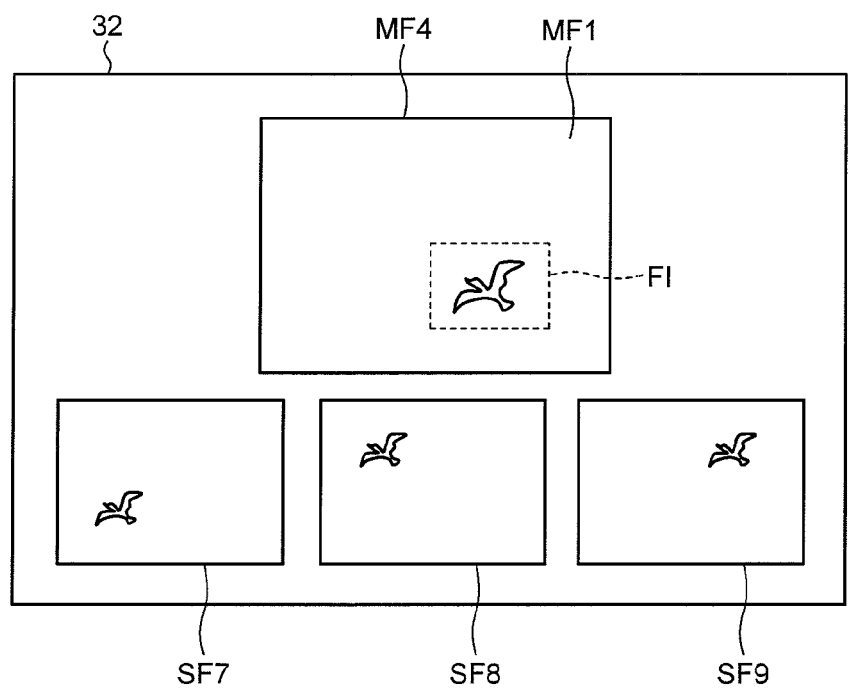
FIG. 13 is a diagram illustrating a modified example of the second embodiment of the present invention.

FIG. 13 is a diagram illustrating a modified example of the second embodiment.

In the above described second embodiment, the image generating unit 376 generates a panoramic image, but not being limited thereto, the image generating unit 376 may be configured to generate a superimposed image described below.

Specifically, the image generating unit 376 executes the following process at Step S124.

The image generating unit 376 reads, based on the characteristic information associated with each partial image data stored in the memory unit 35, the partial image data corresponding to any of the first left and right wide angle lenses 211L and 211R, and the second left and right wide angle lenses 212L and 212R. The image generating unit 376 then generates, based on the range information included in the characteristic information stored in the memory unit 35, a superimposed image resulting from superimposition of instruction information instructing a place corresponding to the area ArO (in the example of FIG. 13, a broken line of a rectangular frame) on the image corresponding to the read partial image data, and stores superimposed image data corresponding to the superimposed image in the memory unit 35.

That is, the image generating unit 376 has a function as a superimposed image generating unit according to the present invention.

Further, if set in the image synthesizing mode (Step S123: Yes), the display control unit 374A executes the following process at Step S109A.

The display control unit 374A identifies, based on the characteristic information associated with each partial image data stored in the memory unit 35, the corresponding partial image data. As illustrated in FIG. 13, the display control unit 374A causes the display unit 32 to display (live view display) a fourth representative image MF4, which is an image corresponding to the superimposed image data stored in the memory unit 35 (an image resulting from superimposition of instruction information FI on the first representative image MF1) and sub images SF7 to SF9, which are images corresponding respectively to three of the areas Ar1L, Ar1R, Ar2L, and Ar2R not used in the generation of the superimposed image by the image generating unit 376, the sub images SF7 to SF9 having a size smaller than that of the fourth representative image MF4, by lining up the respective images MF4 and SF7 to SF9. The respective images MF4 and SF7 to SF9 may be not displayed by being lined up, and may be displayed sequentially by being switched over with one another.

Third Embodiment

Next, a third embodiment of the present invention will be described.

In the description below, to configurations similar to those of the above described first embodiment, the same signs will be appended, and detailed description thereof will be omitted or simplified.

In the above described first embodiment, the optical device 2 does not have an imaging element provided therein, and has a function as a so-called interchangeable lens.

In contrast, an optical device according to this second embodiment has an imaging element provided therein, and the optical device itself has a function as an imaging device. Further, this optical device is connected to an external communication device to be able to transmit and receive information thereto and therefrom. The optical device and communication device form an imaging system according to the present invention.

Hereinafter, a configuration of an imaging system according to this third embodiment will be described.

Configuration of Imaging System

Figure 14:
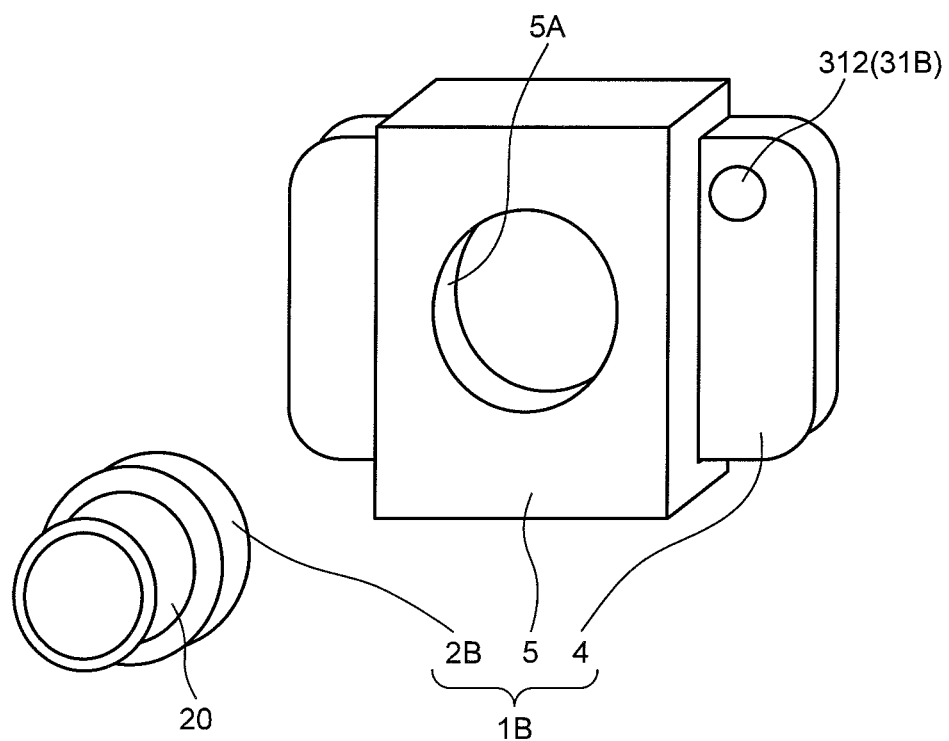
FIG. 14 is a diagram schematically illustrating a configuration of an imaging system according to a third embodiment of the present invention.
Figure 15:
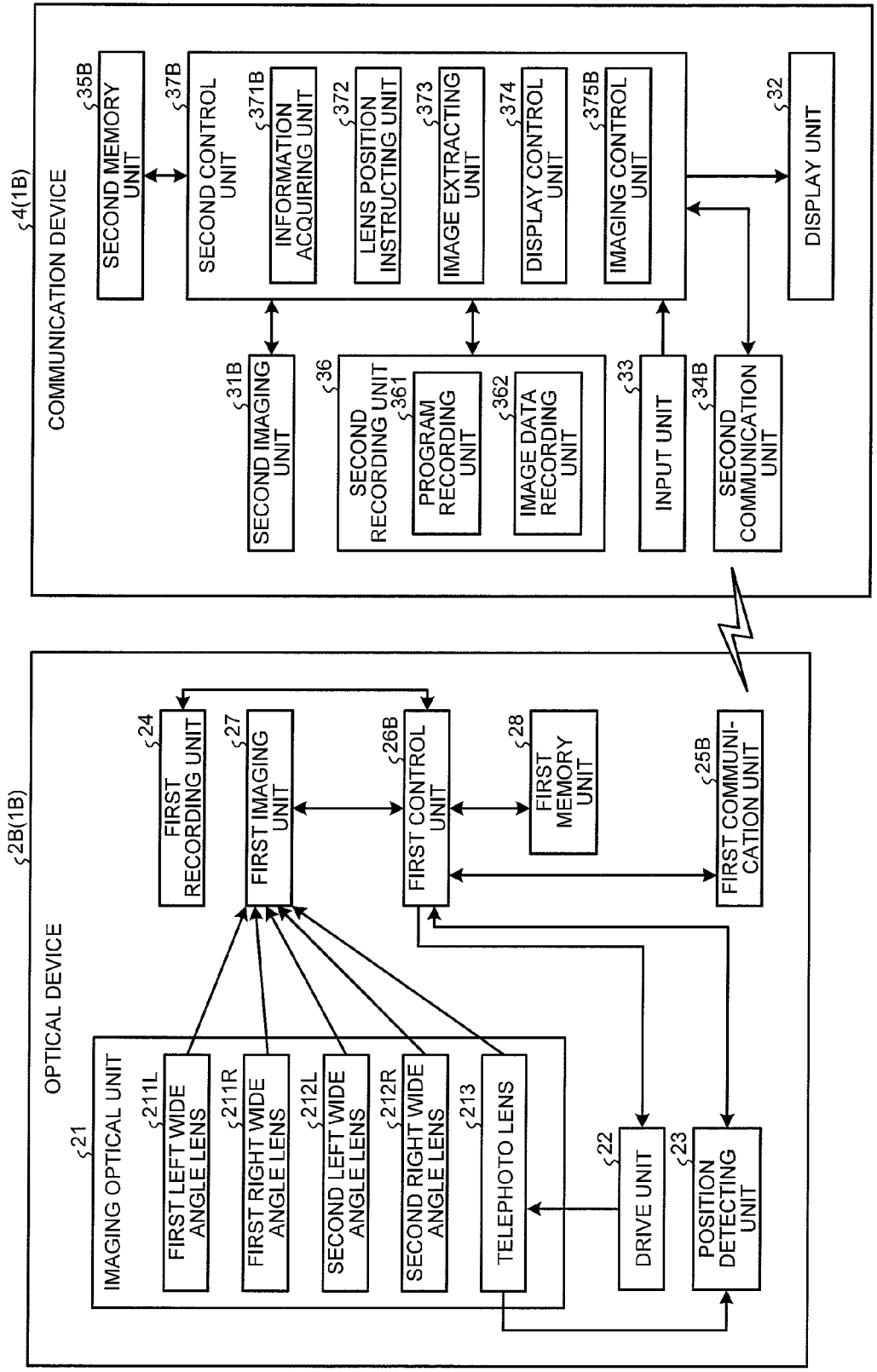
FIG. 15 is a block diagram illustrating a configuration of the imaging system illustrated in FIG. 14.

FIG. 14 is a diagram schematically illustrating a configuration of an imaging system 1B according to a third embodiment of the present invention. FIG. 15 is a block diagram illustrating a configuration of the imaging system 1B.

The imaging system 1B includes: an optical device 2B and a communication device 4 (FIG. 14 and FIG. 15) that are connected to be able to transmit and receive information to and from each other by wireless communication; and an attachment 5 (FIG. 14).

Not being limited to wireless communication, the imaging system 1B may be configured by connecting the optical device 2B and communication device 4 such that transmission and reception of information are possible between each other by wire communication.

Configuration of Attachment

The attachment 5 is a member that mechanically connects the optical device 2B and communication device 4.

More specifically, the attachment 5 is, as illustrated in FIG. 14, attached to a back surface of the communication device 4. Further, the attachment 5 has an attachment hole 5A provided therein, which is circular in a planar view, and into which the optical device 2B is fitted.

In a state where the optical device 2B and the communication device 4 have been mechanically connected to each other via the attachment 5, the whole shape of the imaging system 1B has a shape from which a digital camera is imagined.

The imaging system 1B is not limited to the configuration including the attachment 5, and may be configured by omitting the attachment 5.

Configuration of Optical Device

Examples of the optical device 2B include a first optical device having a plurality of optical axes, and a second optical device having a single optical axis. As described above in the first embodiment, since the second optical device is of a well-known technique, hereinafter, a configuration of the first optical device will be described intensively.

The optical device 2B has, as illustrated in FIG. 15, a configuration approximately similar to that of the optical device (FIG. 1) described above in the first embodiment. More specifically, the optical device 2B includes, in addition to the imaging optical unit 21, the drive unit 22, the position detecting unit 23, and the first recording unit 24, which have been described above in the first embodiment, a first communication unit 25B, a first control unit 26B, a first imaging unit 27, and a first memory unit 28. Each of these members 21 to 24, 25B, 26B, and 27 is accommodated inside a lens barrel 20, approximately the whole of the lens barrel 20 having a column shape. That is, the whole shape of the optical device 2B has a shape approximately similar to the whole shape of a so-called interchangeable lens.

The imaging optical unit 21 according to this third embodiment is different from the imaging optical unit 21 described above in the first embodiment in that in the imaging optical unit 21 according to this third embodiment, an image of condensed light is formed on an imaging plane of an imaging element forming the first imaging unit 27.

The first imaging unit 27 has a configuration and functions similar to those of the imaging unit 31 described above in the first embodiment, and images a subject and generates image data, under control by the first control unit 26B.

The image data generated by the first imaging unit 27 are sequentially stored in the first memory unit 28 under control by the first control unit 26B.

The first communication unit 25B performs, under control by the first control unit 26B, wireless communication of various data including signals required in the communication with the communication device 4, according to a predetermined protocol.

The first control unit 26B has, in addition to functions similar to those of the first control unit 26 described above in the first embodiment, a function of transmitting, to the communication device 4, the latest image data stored in the first memory unit 28, the characteristic information stored in the first recording unit 24, and information related to a position of the telephoto lens 213 detected by the position detecting unit 23, via the first communication unit 25B.

Configuration of Communication Device

The communication device 4 is a device that performs wireless communication with the optical device 2B, and is configured as, for example, a digital camera, a digital video camera, a portable telephone, or a tablet type portable device (in FIG. 14, the communication device 4 is illustrated as a portable telephone (smartphone)).

Hereinafter, main parts of the present invention will be mainly described, as a configuration of the communication device 4.

This communication device 4 has, as illustrated in FIG. 15, a configuration approximately similar to that of the imaging device 3 (FIG. 1) described above in the first embodiment. More specifically, the communication device 4 includes, in addition to the display unit 32, the input unit 33, and the second recording unit 36 described above in the first embodiment, a second imaging unit 31B, a second communication unit 34B, a second memory unit 35B, and a second control unit 37B.

The second imaging unit 31B is provided on a back surface (FIG. 14), and under control by the second control unit 37B, images a subject and generates image data. This second imaging unit 31B is configured by using: an optical system 312 (FIG. 14) that forms a subject image; an imaging element (illustration thereof omitted), such as a CCD, that receives the subject image formed by the optical system 312 and converts the subject image into an electrical signal; a signal processing unit that generates digital image data by performing signal processing (A/D conversion or the like) on the electrical signal (analog signal) from the imaging element; and the like.

The second communication unit 34B performs, under control by the second control unit 37B, wireless communication of various data including signals required in the communication with the optical device 2B, according to a predetermined protocol.

That is, the second communication unit 34B has a function as a third communication unit according to the present invention.

The second memory unit 35B stores therein the image data generated by the second imaging unit 31B, and the image data, the characteristic information, and the like received via the second communication unit 34B.

The second control unit 37B is configured by using a CPU or the like, and comprehensively controls operations of the communication device 4 by performing transfer or the like of instructions and data corresponding to the respective units forming the communication device 4 according to instruction signals or the like from the input unit 33. This second control unit 37B includes, as illustrated in FIG. 15, in addition to the lens position instructing unit 372, the image extracting unit 373, and the display control unit 374 described above in the first embodiment, an information acquiring unit 371B and an imaging control unit 375B.

Similarly to the characteristic information acquiring unit 371 described above in the first embodiment, the information acquiring unit 371B acquires characteristic information and acquires image data from the optical device 2B, via the second communication unit 34B. The information acquiring unit 371B stores the acquired characteristic information and image data in the second memory unit 35B.

If the communication device 4 is set in a communication shooting mode (a mode for imaging a subject by using the optical device 2B), the imaging control unit 375B records, into the image data recording unit 362, similarly to the imaging control unit 375 described above in the first embodiment, image data and partial image data corresponding to images displayed by the display unit 32 when there has been a shooting operation on the input unit 33 by a user of the communication device 4.

On the contrary, if the communication device 4 is set in a normal shooting mode (a mode for imaging a subject by using the second imaging unit 31B), the imaging control unit 375B records, into the image data recording unit 362, the image data generated by the second imaging unit 31B when there has been a shooting operation on the input unit 33 by a user of the communication device 4.

Operations of Imaging System

Next, operations of the above described imaging system 1B will be described.

Hereinafter, as the operations of the imaging system 1B, operations of the optical device 2B and operations of the communication device 4 will be described in order.

Operations of Optical Device

Figure 16:
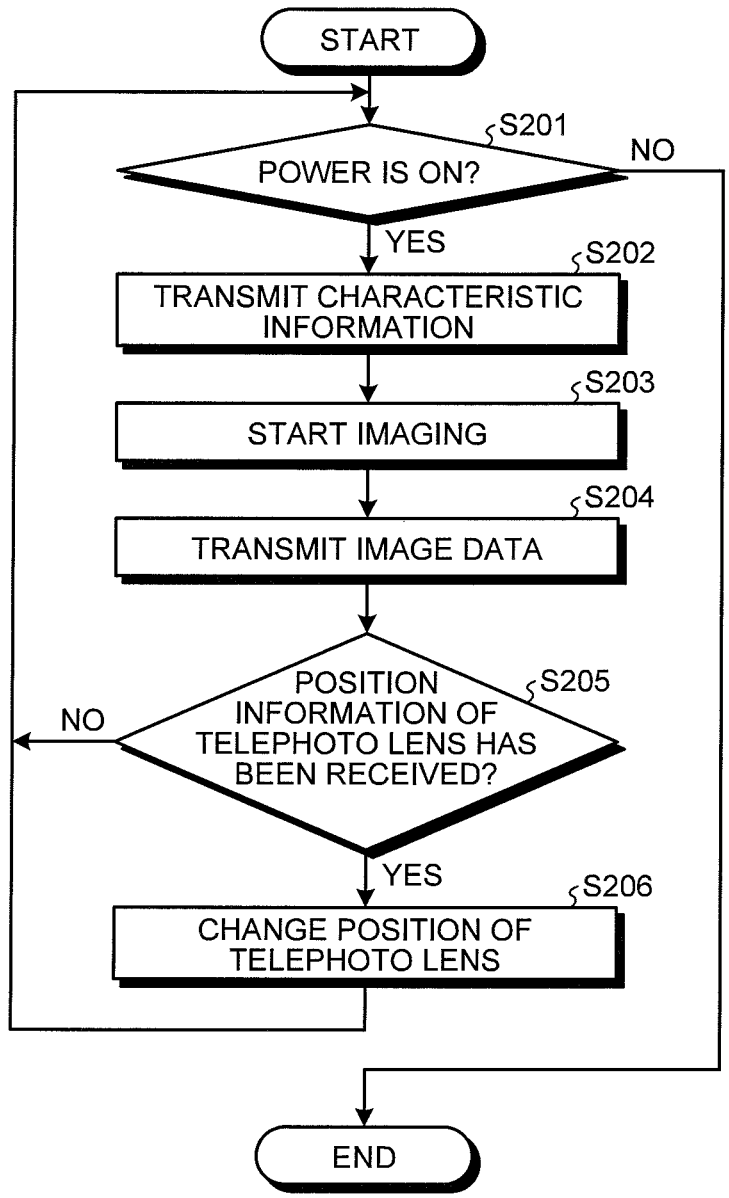
FIG. 16 is a flow chart illustrating operations of an optical device illustrated in FIG. 14 or FIG. 15.

FIG. 16 is a flow chart illustrating the operations of the optical device 2B.

If power of the optical device 2B is turned ON by an operation on an input unit (illustration thereof omitted) by a user of the optical device 2B (Step S201: Yes), the first control unit 26B transmits the characteristic information recorded in the first recording unit 24 to the communication device 4 via the first communication unit 25B (Step S202) and causes the first imaging unit 27 to start imaging (Step S203). The image data generated by the first imaging unit 27 are sequentially stored in the first memory unit 28.

In FIG. 16, for convenience of explanation, a sequence, in which Step S203 is executed after Step S202, is illustrated, but Steps S202 and S203 are actually executed approximately at the same time.

Subsequently, the first control unit 26B sequentially transmits, via the first communication unit 25B, the latest image data stored in the first memory unit 28, to the communication device 4 (Step S204).

Subsequently, the first control unit 26B determines whether or not positional information of a lens having a changeable focus position (if the optical device 2B is the first optical device, the positional information of the telephoto lens 213) has been received from the communication device 4 via the first communication unit 25B (Step S205).

If it is determined that the positional information of the lens has not been received (Step S205: No), the optical device 2B returns to Step S201.

On the contrary, if the first control unit 26B determines that the positional information of the lens has been received (Step S205: Yes), while checking the position of the lens having the changeable focus position detected by the position detecting unit 23 (if the optical device 2B is the first optical device, the position on the optical axis AxO of the telephoto lens 213), the first control unit 26B causes the drive unit 22 to operate to position the lens at a position based on the received positional information (Step S206). Thereafter, the optical device 2B returns to Step S201.

Operations of Communication Device

Figure 17:
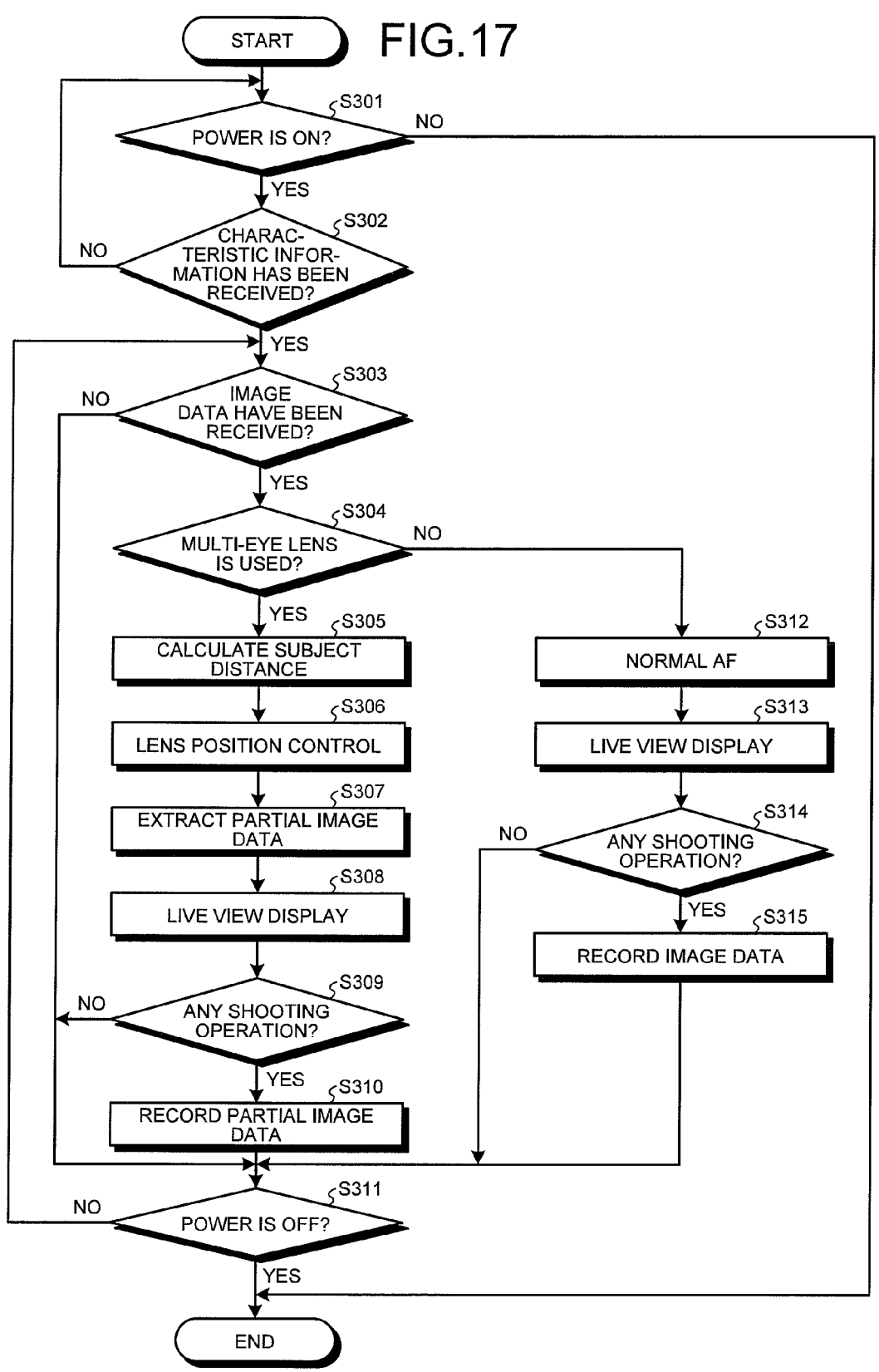
FIG. 17 is a flow chart illustrating operations of a communication device illustrated in FIG. 14 or FIG. 15.

FIG. 17 is a flow chart illustrating operations of the communication device 4.

Hereinafter, the communication device 4 is assumed to be set in the communication shooting mode (the mode in which a subject is imaged by using the optical device 2B).

If the power of the communication device 4 is turned ON by an operation on the input unit 33 by a user of the communication device 4 (Step S301: Yes), the information acquiring unit 371B requests the optical device 2B to transmit the characteristic information and image data via the second communication unit 34B. The information acquiring unit 371B determines whether or not the characteristic information has been received from the optical device 2B via the second communication unit 34B (Step S302).

If it is determined that the characteristic information has not been received (Step S302: No), the communication device 4 returns to Step S301.

On the contrary, if the information acquiring unit 371B determines that the characteristic information has been received (Step S302: Yes), the information acquiring unit 371B determines whether or not the image data have been received from the optical device 2B via the second communication unit 34B (Step S303).

If it is determined that the image data have not been received (Step S303: No), the communication device 4 returns to Step S311.

On the contrary, if the information acquiring unit 371B determines that the image data have been received (Step S303: Yes), the information acquiring unit 371B stores the received image data into the second memory unit 35B. The second control unit 37B then determines whether or not a multi-eye lens is used, similarly to Step S104 described above in the first embodiment (Step S304). That is, in this second embodiment also, the second control unit 37B determines whether or not a multi-eye lens is used by communication of information with the optical device 2B (Steps S202 and S302).

If it is determined that a multi-eye lens is used (Step S304: Yes), the second control unit 37B executes Steps S305 to S310 similar to Steps S106 to S111 described above in the first embodiment. After Step S310, the communication device 4 proceeds to Step S311.

On the contrary, if it is determined that a multi-eye lens is not used (Step S304: No), the second control unit 37B executes Steps S312 to S315 similar to Steps S114 to S117 described above in the first embodiment. After Step S315, the communication device 4 proceeds to Step S311.

After Step S310, after Step S315, or if it is determined, "No", in Step S303, the second control unit 37B determines whether or not the power of the communication device 4 has been turned OFF by an operation on the input unit 33 by a user of the communication device 4 (Step S311).

If the power of the communication device 4 has been turned OFF (Step S311: Yes), the communication device 4 ends this process.

On the contrary, if the state where the power is ON is continuing (Step S311: No), the communication device 4 returns to Step S303.

As described above, the communication device 4 according to this third embodiment (second control unit 37B) changes display control between the time of using the first optical device and the time of using the second optical device by executing Steps S305 to S310 when the first optical device is used and executing Steps S312 to S315 when the second optical device is used.

That is, the communication device 4 has a function as a display device according to the present invention. Further, the second control unit 37B has a function as a control unit according to the present invention.

Like the above described third embodiment, even if the optical device 2B is configured as a lens type camera by including the first imaging unit 27 in the optical device 2B, and the imaging system 1B is configured by connecting the optical device 2B with the communication device 4, such as a smart phone, to be able to transmit and receive information to and from each other, effects similar to those described above in the first embodiment are able to be achieved. For example, an image quality by a lens having a narrow view angle (for telephotography) is able to be enhanced by various measures for improving qualities of images because a subject shot by this is also shootable via other lenses having a wide view angle. For example, distortion, a decrease in light quantity, or the like at a periphery of a screen is able to be corrected by referring to an image of a wide angle lens, and qualities of images are able to be improved by a super-resolution technique in the form of interpolating the image acquired by the wide angle lens. Since such correction effects are able to be expected, it may have a smaller configuration. Similarly, needless to say, by using images acquired by a plurality of lenses, image qualities of images by wide angle lenses are able to be improved and application of processing the images into a panoramic image or a three dimensional image is possible. This may be performed by the display control unit 374 or the like of the communication device 4, and may be aided by providing a dedicated circuit in the second control unit 37B or recording a dedicated image processing program in the program recording unit 361. Image qualities may be improved when the image data are recorded, and application of transmitting the image data to the outside and improving the image qualities at an external device is also possible. By the three dimensional information, artistic expression or the like added with depth information becomes possible and even richer image expression is realized. Since the communication device 4 is used, the imaging system 1B according to this third embodiment is configured to be suitable for performing such image processing in cooperation with an external server or the like, by using various lines, including telephone lines, or the Internet also.

Fourth Embodiment

Next, a fourth embodiment of the present invention will be described.

In the description below, to configurations similar to those described above in the first embodiment, the same signs will be appended, and detailed description thereof will be omitted or simplified.

A configuration of an imaging optical unit of a first optical device according to this fourth embodiment is different from that of the first optical device described above in the first embodiment.

Figure 18:
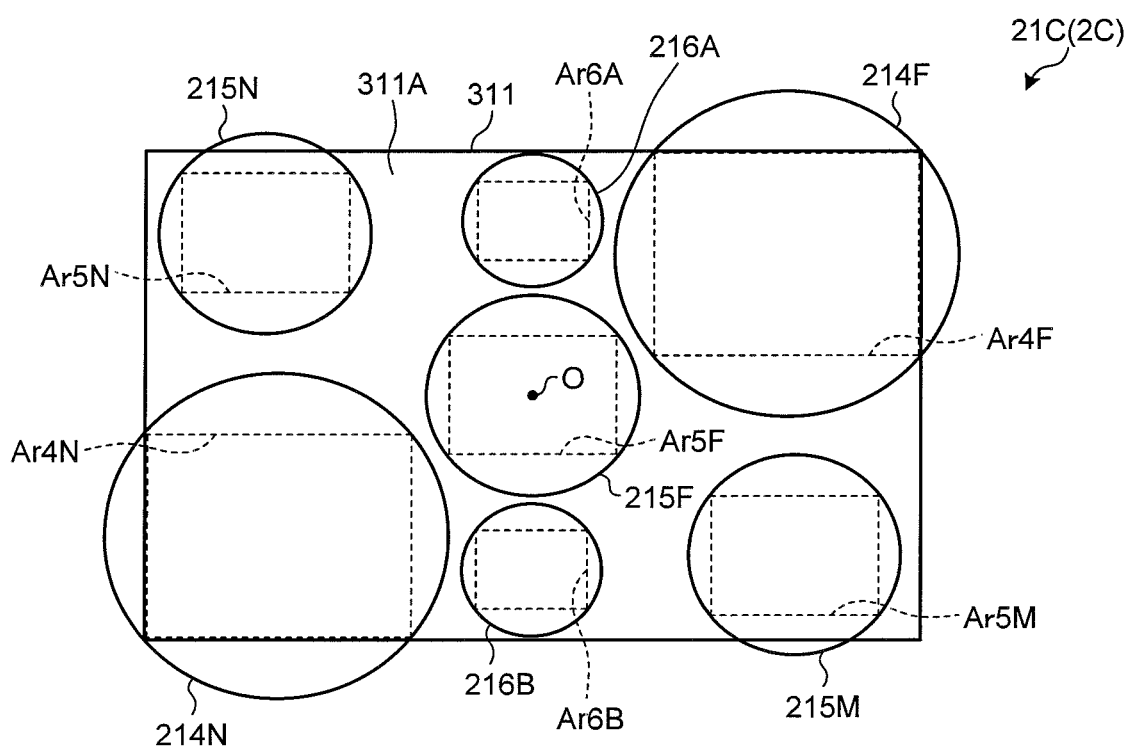
FIG. 18 is a diagram schematically illustrating a configuration of an imaging optical unit according to a fourth embodiment of the present invention.

Hereinafter, a configuration of the imaging optical unit according to this fourth embodiment will be described.
Imaging Optical Unit FIG. 18 is a diagram schematically illustrating a configuration of an imaging optical unit 21C according to the fourth embodiment of the present invention. Specifically, FIG. 18 corresponds to FIG. 2 and is a diagram of the imaging optical unit 21C as viewed from a subject side.

The imaging optical unit 21C includes, as illustrated in FIG. 18, a far distance wide angle lens 214F, a near distance wide angle lens 214N, a first telephoto lens 215N, a second telephoto lens 215F, a third telephoto lens 215M, a first focus adjustment lens 216A, and a second focus adjustment lens 216B.

In FIG. 18, similarly to FIG. 2, for convenience of explanation, each of the lenses 214F, 214N, 215N, 215F, 215M, 216A, and 216B is artificially illustrated as a single lens.

The far distance wide angle lens 214F is a wide angle lens having the same function and same configuration as the first right wide angle lens 211R described above in the first embodiment. That is, the far distance wide angle lens 214F has a function as a first imaging optical system according to the present invention.

The far distance wide angle lens 214F is arranged in the same posture and same position as the first right wide angle lens 211R. That is, the far distance wide angle lens 214F forms, on the imaging plane 311A, a subject image in an area Ar4F (FIG. 18) similar to the area Ar1R described above in the first embodiment.

The near distance wide angle lens 214N is a wide angle lens having the same function and same configuration as the second left wide angle lens 212L described above in the first embodiment. That is, the near distance wide angle lens 214N has a function as a first imaging optical system according to the present invention.

The near distance wide angle lens 214N is arranged in the same posture and same position as the second left wide angle lens 212L. That is, the near distance wide angle lens 214N forms, on the imaging plane 311A, a subject image in an area Ar4N (FIG. 18) similar to the area Ar2L described above in the first embodiment.

The first telephoto lens 215N is configured of a telephoto lens having the same focal distance as the telephoto lens 213 described above in the first embodiment and having a focus position at a near distance. That is, the first telephoto lens 215N has a function as a second imaging optical system according to the present invention.

The first telephoto lens 215N is supported by a lens barrel (illustration thereof omitted) such that the first telephoto lens 215N is postured and positioned as described below in a state where an optical device 2C (FIG. 18) according to this fourth embodiment is attached to the imaging device 3.

The first telephoto lens 215N is supported by the lens barrel such that the first telephoto lens 215N is postured with its optical axis (illustration thereof omitted) being vertical to the imaging plane 311A and the first telephoto lens 215N is positioned on the upper left of the center "O" of the imaging plane 311A as viewed from the subject side. That is, the first telephoto lens 215N forms a subject image in an area Ar5N on the upper left in the imaging plane 311A.

The second telephoto lens 215F is configured of a telephoto lens having the same focal distance as the telephoto lens 213 described above in the first embodiment and having a focus position at a far distance. That is, the second telephoto lens 215F has a function as a second imaging optical system according to the present invention.

The second telephoto lens 215F is arranged in the same posture and same position as the telephoto lens 213. That is, the second telephoto lens 215F forms, on the imaging plane 311A, a subject image in an area Ar5F (FIG. 18) similar to the area ArO described above in the first embodiment.

The third telephoto lens 215M is configured of a telephoto lens having the same focal distance as the telephoto lens 213 described above in the first embodiment and having a focus position at a distance intermediate between those of the first and second telephoto lenses 215N and 215F. That is, the third telephoto lens 215M has a function as a second imaging optical system according to the present invention.

The third telephoto lens 215M is supported by the lens barrel such that the third telephoto lens 215M is postured and positioned as described below in a state where the optical device 2C according to this fourth embodiment is attached to the imaging device 3.

The third telephoto lens 215M is supported by the lens barrel such that the third telephoto lens 215M is postured with its optical axis (illustration thereof omitted) being vertical to the imaging plane 311A and the third telephoto lens 215M is positioned on the lower right of the center "O" of the imaging plane 311A as viewed from the subject side. That is, the third telephoto lens 215M forms a subject image in an area Ar5M on the lower right in the imaging plane 311A.

The above described first to third telephoto lenses 215N, 215F, and 215M are configured, similarly to the telephoto lens 213 described above in the first embodiment, to be movable along their optical axes inside the lens barrel and such that their focus positions are changeable. That is, the optical device 2C according to this third embodiment has three of the drive units 22 and position detecting units 23 described above in the first embodiment, correspondingly with the first to third telephoto lenses 215N, 215F, and 215M.

The first and second focus adjustment lenses 216A and 216B are lenses used when AF is performed. That is, the first and second focus adjustment lenses 216A and 216B have a function as a focus optical system according to the present invention.

The first and second focus adjustment lenses 216A and 216B are supported by the lens barrel such that the first and second focus adjustment lenses 216A and 216B are postured and positioned as described below in the state where the optical device 2C according to this fourth embodiment has been attached to the imaging device 3.

The first and second focus adjustment lenses 216A and 216B are supported by the lens barrel such that they are respectively positioned above and below the center "O" of the imaging plane 311A as viewed from the subject side in a posture with their optical axes (illustration thereof omitted) being vertical to the imaging plane 311A. That is, the first and second focus adjustment lenses 216A and 216B respectively form subject images in an upper area Ar6A and a lower area Ar6B in the imaging plane 311A.

In the first recording unit 24 according to this fourth embodiment, for each of the above described lenses 214F, 214N, 215N, 215F, 215M, 216A, and 216B, respective characteristic information (range information, optical axis coordinate information, focal distance information (view angle information), focus adjustment information, use information, pair information, separation distance information, and the like) related to characteristics of the each of these lenses 214F, 214N, 215N, 215F, 215M, 216A, and 216B is recorded.

Operations of Imaging System

Next, operations of an imaging system according to this fourth embodiment will be described.

Figure 19:
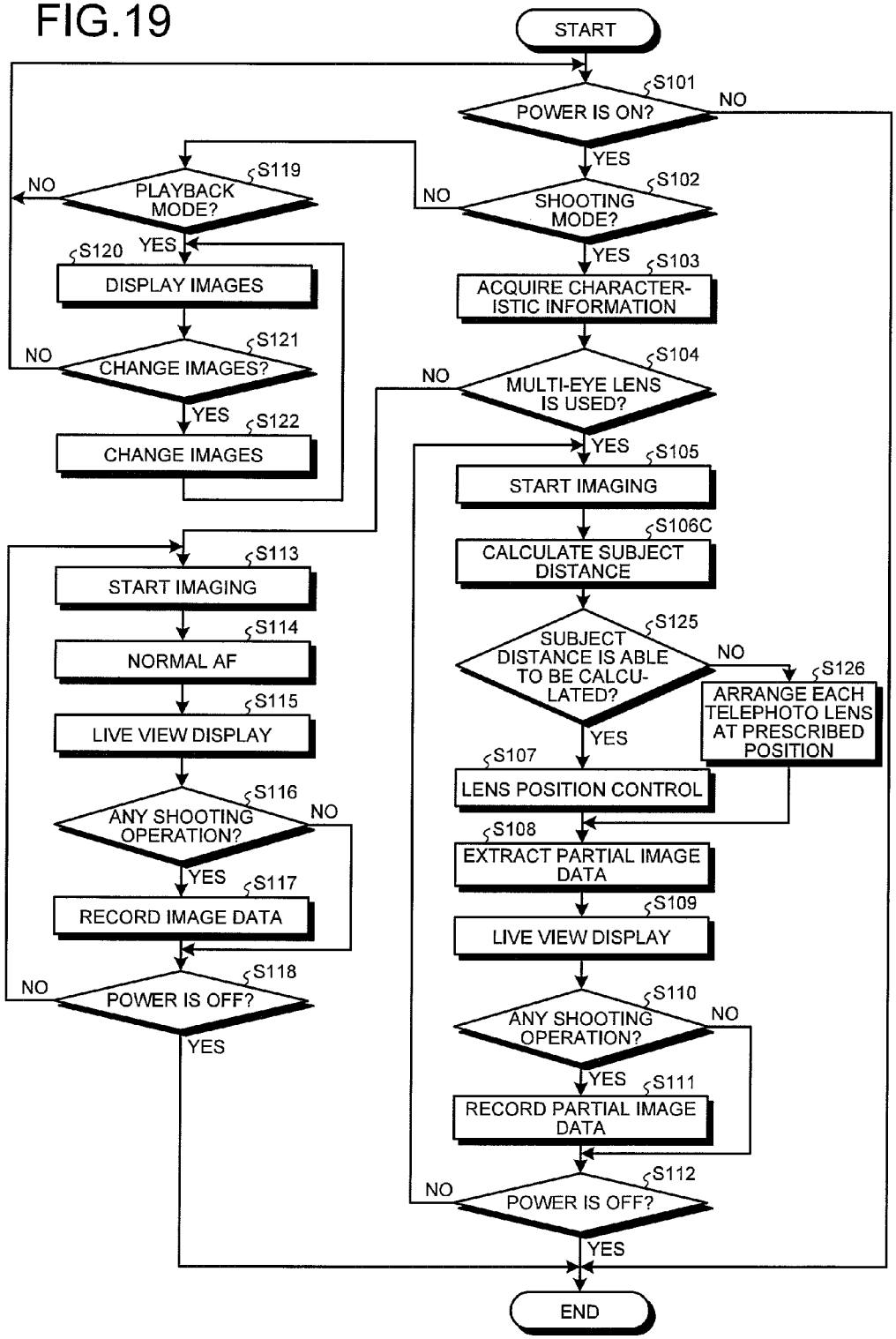
FIG. 19 is a flow chart illustrating operations of an imaging system according to the fourth embodiment of the present invention.

FIG. 19 is a flow chart illustrating operations of the imaging system according to the fourth embodiment.

The operations of the imaging system according to this fourth embodiment are different from the operations (FIG. 9) of the imaging system described above in the first embodiment only in that, as illustrated in FIG. 19, Steps S125 and S126 are added, and Step S106C is used instead of Step S106.

Therefore, hereinafter, only Steps S125, S126, and S106C will be described.

A lens position instructing unit 372 according to this fourth embodiment executes an AF process for the first to third telephoto lenses 215N, 215F, and 215M, which are the lenses with changeable focus positions, from the lenses included in the optical device 2C, at Steps S106C, S125, S107, and S126.

Specifically, the lens position instructing unit 372 calculates a subject distance, as described below, at Step S106C.

That is, the lens position instructing unit 372 identifies, based on the use information and pair information included in the characteristic information (characteristic information acquired from the optical device 2C) stored in the memory unit 35, lenses of a pair to be used when AF of the first to third telephoto lenses 215N, 215F, and 215M is performed, to be the first and second focus adjustment lenses 216A and 216B. Further, the lens position instructing unit 372 recognizes, based on the range information included in the characteristic information stored in the memory unit 35, the areas Ar6A and Ar6B, where the first and second focus adjustment lenses 216A and 216B form the subject images in the imaging plane 311A. The lens position instructing unit 372 then reads the latest image data stored in the memory unit 35, and based on the position of the subject image photographed in the area Ar6A or area Ar6B in the image area of the latest image data, similarly to the above described first embodiment, calculates a subject distance by using the principle of triangulation.

Subsequently, the lens position instructing unit 372 determines whether or not a subject distance has been able to be calculated in Step S106C (Step S125).

Cases where a subject distance has not been able to be calculated include, for example, a case where the contrast of the partial image data corresponding to the area Ar6A or area Ar6B is low, and a case where a subject image ("bird" or the like as in the example of FIG. 7) is not included in the partial image data.

If it is determined that a subject distance has been able to be calculated (Step S125: Yes), the lens position instructing unit 372 acquires, based on the focus adjustment information included in the characteristic information stored in the memory unit 35, positions of the first to third telephoto lenses 215N, 215F, and 215M corresponding to the calculated subject distance and transmits positional information related to the acquired positions of the first to third telephoto lenses 215N, 215F, and 215M to the optical device 2C via the second communication unit 34 (Step S107).

On the contrary, if it is determined that the subject distance has not been able to be calculated (Step S125: No), the lens position instructing unit 372 transmits, in order to position the first to third telephoto lenses 215N, 215F, and 215M at prescribed positions that have been determined beforehand, the positional information related to the prescribed positions recorded in the second recording unit 36 to the optical device 2C via the second communication unit 34 (Step S126). That is, Step S126 aims to bring an image acquired by any of the first to third telephoto lenses 215N, 215F, and 215M (an image corresponding to the area Ar5N, Ar5F, or Ar5M) into focus, by positioning the first to third telephoto lenses 215N, 215F, and 215M at the prescribed positions.

Further, at Step S111, the image extracting unit 373 according to this fourth embodiment respectively extracts, based on the range information or the like included in the characteristic information (characteristic information acquired from the optical device 2C) stored in the memory unit 35, the partial image data corresponding to the areas Ar4F, Ar4N, Ar5N, Ar5F, and Ar5M based on the range information, from the image area of the latest image data.

Even if the imaging optical unit 21C is configured as described above in this fourth embodiment, effects similar to those of the above described first embodiment are able to be achieved.

Fifth Embodiment

Next, a fifth embodiment of the present invention will be described.

In the description below, to configurations similar to those of the above described fourth embodiment, the same signs will be appended, and detailed description thereof will be omitted or simplified.

A configuration of an imaging optical unit of an optical device according to this fifth embodiment is different from that of the optical device 2C described above in the fourth embodiment.

Hereinafter, a configuration of the imaging optical unit according to this fifth embodiment will be described.
Configuration of Imaging Optical Unit An imaging optical unit 21D according to this fifth embodiment is different from the imaging optical unit 21C described above in the fourth embodiment in that the first and second focus adjustment lenses 216A and 216B are omitted, and the second telephoto lens 215F is configured of a diffraction lens.

Figure 20A:
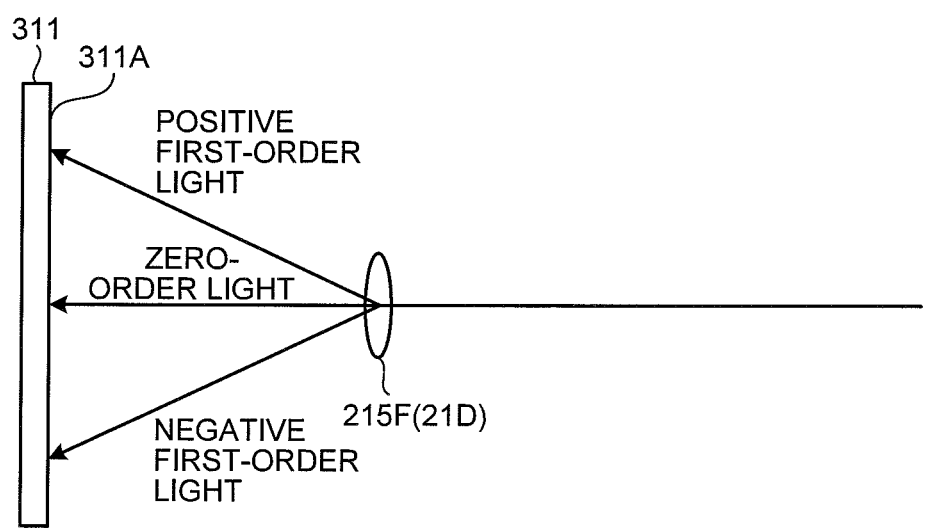
FIG. 20A is a diagram schematically illustrating a configuration of a second telephoto lens according to a fifth embodiment of the present invention.
Figure 20B:
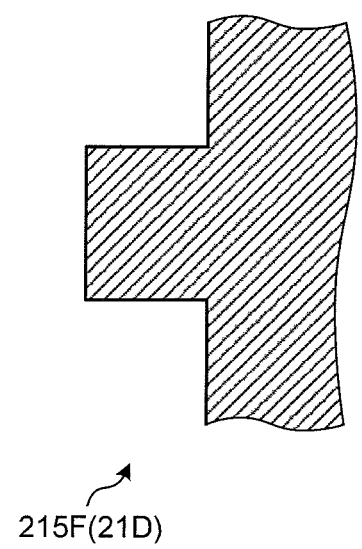
FIG. 20B is a diagram schematically illustrating a configuration of the second telephoto lens according to the fifth embodiment of the present invention.

FIG. 20A and FIG. 20B are diagrams schematically illustrating the second telephoto lens 215F according to the fifth embodiment of the present invention. Specifically, FIG. 20A is a diagram of the second telephoto lens 215F as viewed from the side. FIG. 20B is an enlarged diagram of a surface of the second telephoto lens 215F.

The second telephoto lens 215F according to this fifth embodiment is configured of a diffraction lens having concavity and convexity formed on its surface, as illustrated in FIG. 20A or FIG. 20B.

The second telephoto lens 215F forms an image of zero-order light in the area Ar5F described above in the fourth embodiment in the imaging plane 311A. Further, the second telephoto lens 215F respectively forms images of positive first-order light and negative first-order light, which are diffracted light, over the areas Ar6A and Ar6B described above in the fourth embodiment in the imaging plane 311A.

In this fifth embodiment, characteristic information of the second telephoto lens 215F is different from the characteristic information described above in the fourth embodiment.

Specifically, range information thereof is information corresponding to the above described areas Ar5F, Ar6A, and Ar6B. Use information thereof is information indicating that the lens is a lens to be used when AF is performed.

At Step S106C, the lens position instructing unit 372 according to this fifth embodiment calculates, based on the characteristic information stored in the memory unit 35, a subject distance, based on a position of a subject image photographed in the area Ar6A or area Ar6B in the image area of the latest image data.

When the imaging optical unit 21D is configured as described above in this fifth embodiment, as compared with the above described fourth embodiment, AF of the first to third telephoto lenses 215N, 215F, and 215M is able to be performed while being able to omit the first and second focus adjustment lenses 216A and 216B.

Other Embodiments

Thus far, modes for carrying out the present invention have been described, but the present invention is not to be limited only to the above described first to fifth embodiments. In particular, although the description has been made by using the expression "the latest" in the sentences, according to the system configuration or performance, the performance limit of the software, the response speed of users, and the like, those deviated from the latest timing may be adapted as appropriate so long as no contradiction arises in the concept of the present invention.

Although each of the imaging optical units 21, 21C, and 21D according to the above described first to fifth embodiments is configured by combining lenses of different types (wide angle lenses and telephoto lenses), not being limited thereto, it may be configured by combining lenses of the same type (wide angle lenses or telephoto lenses).

The posture and arrangement position of each lens forming the imaging optical units 21, 21C, and 21d according to the above described first to fifth embodiments are not limited to the postures and arrangement positions described in the above described first to fifth embodiments, and other postures and arrangement positions may be used.

For example, in the imaging optical unit 21, the posture of each of the four wide angle lenses 211L, 211R, 212L, and 212R may be changed as described below.

Specifically, the first left wide angle lens 211L may be arranged in a posture directed to the left side or diagonally to the upper left side, as viewed from the subject side. The first right wide angle lens 211R may be arranged in a posture directed to the right side or diagonally to the upper right side, as viewed from the subject side. The second left wide angle lens 212L may be arranged in a posture directed to the left side or diagonally to the lower left side, as viewed from the subject side. The second right wide angle lens 212R may be arranged in a posture directed to the right side or diagonally to the lower right side, as viewed from the subject side. That is, each of the four wide angle lenses 211L, 211R, 212L, and 212R may be arranged in a posture directed to the outside to have a tilt or a shift.

Although in the above described first to fifth embodiments, the areas Ar1L, Ar1R, Ar2L, Ar2R, ArO, Ar4F, Ar4N, Ar5N, Ar5F, Ar5M, Ar6A, and Ar6B used in extracting the partial image data are rectangular areas that are long sideways, not being limited thereto, they may be rectangular areas that are vertically long.

In the above described first to fifth embodiments, a hand-shake correction mechanism for performing hand-shake correction may be provided. For example, an optical hand-correction mechanism, which performs hand-shake correction by moving at least a part of the lens groups forming the telephoto lens 213 (first to third telephoto lenses 215N, 215F, and 215M), may be used.

Although in the above described first and third to fifth embodiments, the extraction of the partial image data (Step S108 or S307) was executed before the live view display (Step S109 or S308), limitation is not made thereto. For example, it may be configured such that in the live view display (Step S109 or S308), approximately the whole of the image captured by the imaging element 311 is displayed by the display unit 32, and if there is a shooting operation (Step S116: Yes, or Step S309: Yes), extraction of the partial image data (Step S108 or S308) is executed.

Further, the process flows are not limited to the sequences of the processes in the flow charts described above in the first to fifth embodiments, and may be changed so long as no contradiction arises.

Further, algorithms of the processes described by using the flow charts in this specification may be described as programs. Such a program may be recorded in a recording unit inside a computer or recorded in a computer readable recording medium. Recording of the program in the recording unit or recording medium maybe performed when the computer or recording medium is shipped as a product or may be performed by downloading via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging system, comprising:
an imaging device; and
an optical device that forms a subject image on an imaging plane of an imaging element and that is freely attachable to and detachable from the imaging device, wherein
the optical device includes a combination of a plurality of optical systems to provide a plurality of optical axes,
the plurality of optical systems include:
a plurality of first imaging optical systems; and
a second imaging optical system having a view angle narrower than that of each of the plurality of first imaging optical systems, and
the plurality of first imaging systems are respectively arranged to surround the second imaging optical system, as viewed from a subject side, wherein, when the optical device is attached to the imaging device, each of the plurality of first imaging optical systems is fixed with respect to an optical axis normal to an imaging plane of the imaging device, but the second imaging optical system is movable along the optical axis.

2. The imaging system according to claim 1, wherein the optical device includes:
a characteristic information recording unit that records therein respective characteristic information related to characteristics of the plurality of optical systems; and
a first communication unit that is connected to an external device to transmit and receive information to and from the external device and that transmits the characteristic information to the external device,
the characteristic information includes range information related to ranges occupied by respective subject images formed by the plurality of first imaging optical systems and the second imaging optical system on the imaging plane of the imaging element,
the imaging device includes:
the imaging element that is provided singly and that has the imaging plane that covers the ranges occupied by the respective subject images;
a second communication unit that is connected to the optical device to transmit and receive information to and from the optical device and that receives the characteristic information transmitted from the first communication unit; and
an image extracting unit that extracts, based on the range information included in the characteristic information received by the second communication unit, respective images corresponding to the ranges occupied by the respective subject images in the whole image area of an image captured by the imaging element.

3. The imaging system according to claim 2, wherein the imaging device further includes:
a display unit; and
a display control unit that causes the display unit to display the respective images extracted by the image extracting unit by lining up the respective images.

4. The imaging system of claim 2 wherein, the characteristic information includes, for each of the plurality of first imaging optical systems, at least one of (A) use information specifying whether or not the first imaging optical system is to be used for auto focusing, (B) pair information grouping at least two of the first imaging optical systems to be used for autofocusing, and (C) separation distance information specifying a distance to a pair of first imaging optical systems.

5. The imaging system according to claim 1, wherein the optical device includes:
a characteristic information recording unit that records therein respective characteristic information related to characteristics of the plurality of optical systems; and
a drive unit that changes a focus position of at least one of the plurality of optical systems,
the plurality of first imaging optical systems include a pair of focus optical systems that are used for respectively forming subject images on the imaging plane of the imaging element and adjusting the focus position, and
the characteristic information related to the characteristics of one of the pair of focus optical systems include pair information indicating the other of the pair of focus optical systems that is to be used together with the one of the pair of focus optical systems.

6. A display system, comprising:

a display device; and an optical device that forms a subject image on an imaging plane of an imaging element, that is freely attachable to and detachable from the display device, and that is freely attachable to and detachable from an imaging device, wherein the optical device includes:
- a plurality of optical systems that have a plurality of optical axes with different view angles and that respectively form subject images of a plurality of different view angles on the imaging plane of the imaging element; and
- a transmitting unit that transmits positional information related to positions at which the subject images are formed, and the display device includes:
- a receiving unit that receives, when the optical device is attached to the display device, the positional information from the optical device; and
- a display control unit that causes display of the subject images of the plurality of different view angles to be changeable according to a result of reception by the receiving unit, wherein the plurality of optical systems include:
- a plurality of first imaging optical systems; and
- a second imaging optical system having a view angle narrower than that of each of the plurality of first imaging optical systems, and the plurality of first imaging optical systems are respectively arranged to surround the second imaging optical system, as viewed from a subject side, and wherein, when the optical device is attached to the imaging device, each of the plurality of first imaging optical systems is fixed with respect to an optical axis normal to an imaging plane of the imaging device, but the second imaging optical system is movable along the optical axis.

7. An optical device, comprising:

an imaging optical unit that includes a combination of a plurality of optical systems to provide a plurality of optical axes, that respectively forms a plurality of subject images on an imaging plane of an imaging element by the plurality of optical systems, and that is freely attachable to and detachable from an imaging device;

a characteristic information recording unit that records therein respective characteristic information related to characteristics of the respective optical systems constituting the imaging optical unit; and a transmitting unit that transmits the characteristic information to a device that performs imaging in cooperation with the optical device, wherein the plurality of optical systems include:
- at least one first imaging optical system; and
- a second imaging optical system having a view angle narrower than that of the at least one first imaging optical system, wherein the at least one first imaging optical system includes a plurality of first imaging optical systems; and the plurality of first imaging optical systems are respectively arranged to surround the second imaging optical system, as viewed from a subject side, and wherein, when the optical device is attached to the imaging device, each of the plurality of first imaging optical systems is fixed with respect to an optical axis normal to an imaging plane of the imaging device, but the second imaging optical system is movable along the optical axis.

8. The optical device of claim 7, wherein the characteristic information includes range information related to ranges occupied by the respective subject images formed by the plurality of optical systems on the imaging plane of the imaging element.

9. The optical device of claim 7, further comprising a drive unit that changes a focus position of at least one of the plurality of optical systems, wherein the imaging optical unit includes a pair of focus optical systems that are used for respectively forming subject images on the imaging plane of the imaging element and adjusting the focus position, and the characteristic information related to the characteristics of one of the pair of focus optical systems include pair information indicating the other of the pair of focus optical systems that is to be used together with the one of the pair of focus optical systems.

10. The optical device according to claim 9, wherein the at least one first imaging optical system includes a plurality of first imaging optical systems; and the plurality of first imaging optical systems include the pair of focus optical systems.

11. The optical device of claim 7, wherein the second imaging optical system includes a diffraction lens.

12. The optical device of claim 7 wherein, the characteristic information includes, for each of the plurality of first imaging optical systems, at least one of (A) use information specifying whether or not the first imaging optical system is to be used for auto focusing, (B) pair information grouping at least two of the first imaging optical systems to be used for autofocusing, and (C) separation distance information specifying a distance to a pair of first imaging optical systems.

* * * * *